US012730969B2

(12) United States Patent
Ward et al.

(10) Patent No.: US 12,730,969 B2
(45) Date of Patent: Sep. 8, 2026

(54) MULTISTAGE ALIGNMENT FOR GENERATING ARTIFICIAL INTELLIGENCE TRAINING DATA

(71) Applicant: Deepgram, Inc., San Francisco, CA (US)

(72) Inventors: Jeffrey Michael Ward, Oak Harbor, WA (US); Andrew Nathan Seagraves, Houston, TX (US); Matthew Benson Lightman, Ann Arbor, MI (US); Scott Ivan Stephenson, Burlingame, CA (US); Adam Joseph Sypniewski, Dexter, MI (US)

(73) Assignee: Deepgram, Inc., San Francisco, CA (US)

( * ) Notice: Subject to any disclaimer, the term of this patent is extended or adjusted under 35 U.S.C. 154(b) by 147 days.

(21) Appl. No.: 18/598,217

(22) Filed: Mar. 7, 2024

(65) Prior Publication Data

US 2025/0284889 A1 Sep. 11, 2025

Related U.S. Application Data

(63) Continuation of application No. 18/597,631, filed on Mar. 6, 2024.

(51) Int. Cl.
*G06F 40/284* (2020.01)
*G10L 13/08* (2013.01)
(Continued)

(52) U.S. Cl.
CPC ............ *G06F 40/284* (2020.01); *G10L 13/08* (2013.01); *G10L 15/02* (2013.01); *G10L 15/04* (2013.01);
(Continued)

(58) Field of Classification Search
CPC ..... G06F 40/284; G10L 15/063; G10L 25/30; G10L 25/51
See application file for complete search history.

(56) References Cited

U.S. PATENT DOCUMENTS 5,937,384 A * 8/1999 Huang .................. G06F 18/295 704/254
6,421,641 B1 * 7/2002 Huang .................... G10L 15/07 704/250

(Continued)

OTHER PUBLICATIONS

Bain, Max, et al. "Whisperx: Time-accurate speech transcription of long-form audio." arXiv preprint arXiv:2303.00747 (2023).

(Continued)

*Primary Examiner* — Pierre Louis Desir
*Assistant Examiner* — Daniel W Chung
(74) *Attorney, Agent, or Firm* — Cognition IP, P.C.; Edward Steakley; Saleh Kaihani

(57) ABSTRACT

Artificial intelligence (AI) training data includes pairs of known input and output. Training an AI model includes generating an output from the model, comparing it against a known output, and modifying the model parameters until the model generates an output close to the known output. For speech recognition AI models, the training data includes pairs of audio files and corresponding transcripts. Dividing the audio files into chunks can be beneficial for the training of a speech recognition AI model. However, transcripts may not include timing or alignment data to find a corresponding transcript portion when dividing an audio file. A first stage alignment can generate timing labels for the speech tokens in a transcript. When dividing an audio file into audio file chunks, the timing labels can be used to find corresponding transcript portions to audio file chunks. A second stage alignment can improve the accuracy of the timing labels.

20 Claims, 13 Drawing Sheets

(51) Int. Cl.

| | |
|---|---|
| ***G10L 15/02*** | (2006.01) |
| ***G10L 15/04*** | (2013.01) |
| ***G10L 15/06*** | (2013.01) |
| ***G10L 15/26*** | (2006.01) |
| ***G10L 25/30*** | (2013.01) |
| ***G10L 25/51*** | (2013.01) |

(52) U.S. Cl.

CPC ............ *G10L 15/063* (2013.01); *G10L 15/26* (2013.01); *G10L 25/30* (2013.01); *G10L 25/51* (2013.01); *G10L 2015/025* (2013.01)

(56) References Cited

U.S. PATENT DOCUMENTS

| | | | |
|---|---|---|---|
| 8,131,545 | B1 | 3/2012 | Moreno et al. |
| 2016/0133251 | A1 | 5/2016 | Kadirkamanathan et al. |
| 2021/0103635 | A1 | 4/2021 | Liao et al. |
| 2021/0233535 | A1 | 7/2021 | Shir |
| 2021/0312905 | A1* | 10/2021 | Zhao ..................... G10L 15/063 |
| 2022/0199071 | A1* | 6/2022 | Voss ........................ G10L 15/02 |
| 2023/0223018 | A1 | 7/2023 | Xing et al. |
| 2025/0156642 | A1 | 5/2025 | Serry et al. |
| 2025/0285612 | A1 | 9/2025 | Ward et al. |

OTHER PUBLICATIONS

Demirel, Emir, Sven Ahlback, and Simon Dixon. "Low resource audio-to-lyrics alignment from polyphonic music recordings." ICASSP 2021—2021 IEEE International Conference on Acoustics, Speech and Signal Processing (ICASSP). IEEE, 2021.

* cited by examiner

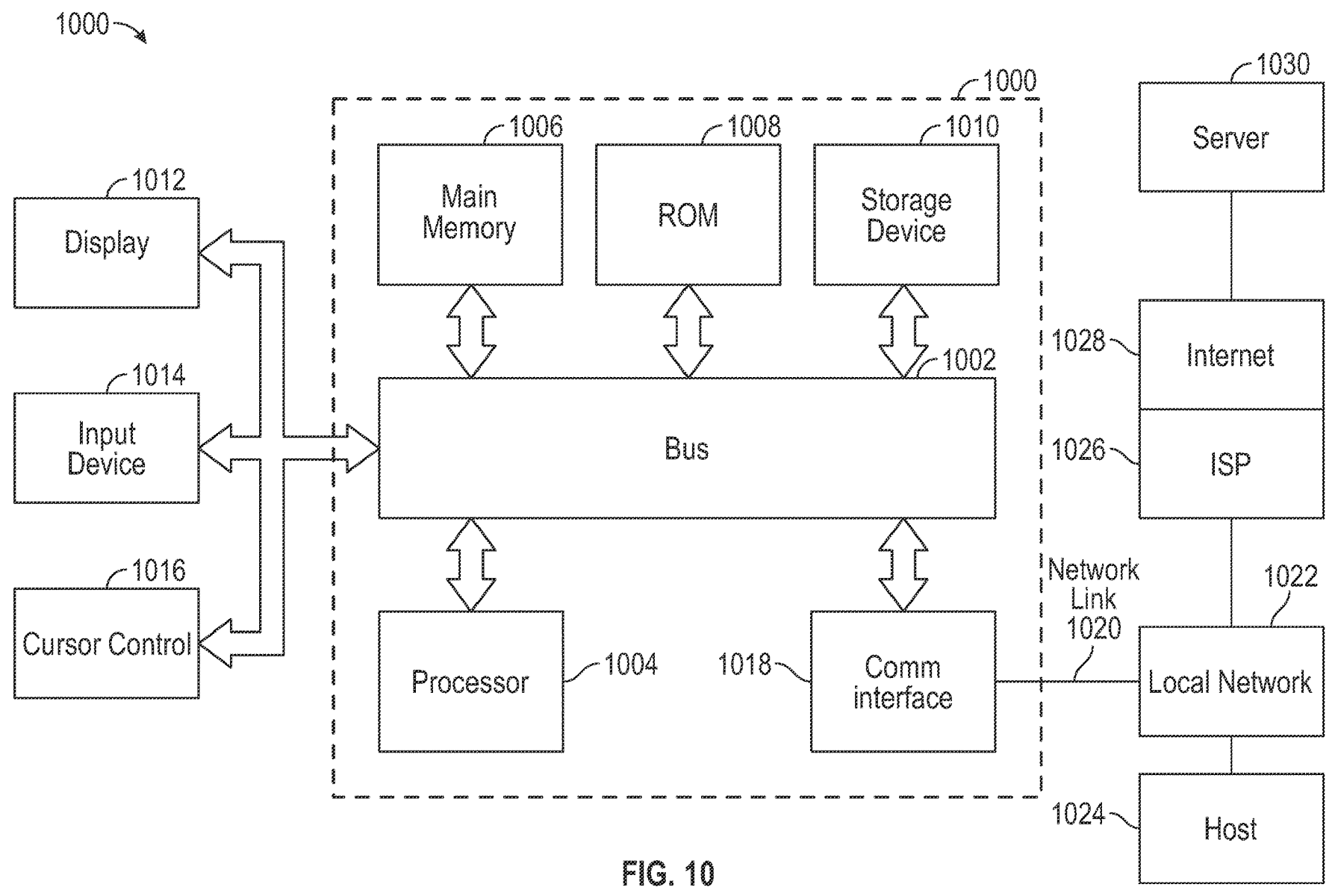

1000

1012 Display

1014 Input Device

1016 Cursor Control

1000

1006 Main Memory

1008 ROM

1010 Storage Device

1002 Bus

1004 Processor

1018 Comm interface

Network Link 1020

1022 Local Network

1024 Host

1026 ISP

1028 Internet

1030 Server

FIG. 10

MULTISTAGE ALIGNMENT FOR GENERATING ARTIFICIAL INTELLIGENCE TRAINING DATA

CROSS REFERENCE TO RELATED APPLICATIONS

This application is a continuation of U.S. patent application Ser. No. 18/597,631, filed on Mar. 6, 2024, and titled "MULTISTAGE ALIGNMENT FOR GENERATING ARTIFICIAL INTELLIGENCE TRAINING DATA," the contents of which are incorporated in their entirety and are considered part of this disclosure.

BACKGROUND

Field

This invention relates generally to the field of artificial intelligence models and more particularly to generating training data for artificial intelligence models.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Artificial intelligence (AI) models are trained using pairs of known input, output data. In the context of training automatic speech recognition (ASR) models, the underlying AI models are trained using pairs of audio files and associated transcripts of the audio files. In some scenarios, it can be more efficient to break up a training audio file into chunks. However, the transcripts corresponding to the audio files do not always include timing information, relating portions of the transcripts to the audio files. As a result, when breaking up a training audio file, it is not always possible to efficiently determine transcript portions, corresponding to the audio file chunks. Therefore, there is a need for systems and methods to find an alignment or mapping between audio files and their corresponding transcripts.

Alignment, in this context, can become more challenging, when an audio file, and/or the transcript of the audio file, contain information that have no corresponding portion in the other. For example, some audio files can include multiple languages, while the corresponding transcripts can include the transcripts of only one of the languages spoken in the audio files. Conversely, some transcripts can include text that do not have a corresponding audio portion, such as headers, paragraph numbers or other textual, non-auditory information. Consequently, there is a need for alignment systems and techniques that can account for non-matching portions of the audio files and their corresponding transcripts when performing alignment.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 10 illustrates an embodiment in which some embodiments may operate.

DETAILED DESCRIPTION

Figure 1:
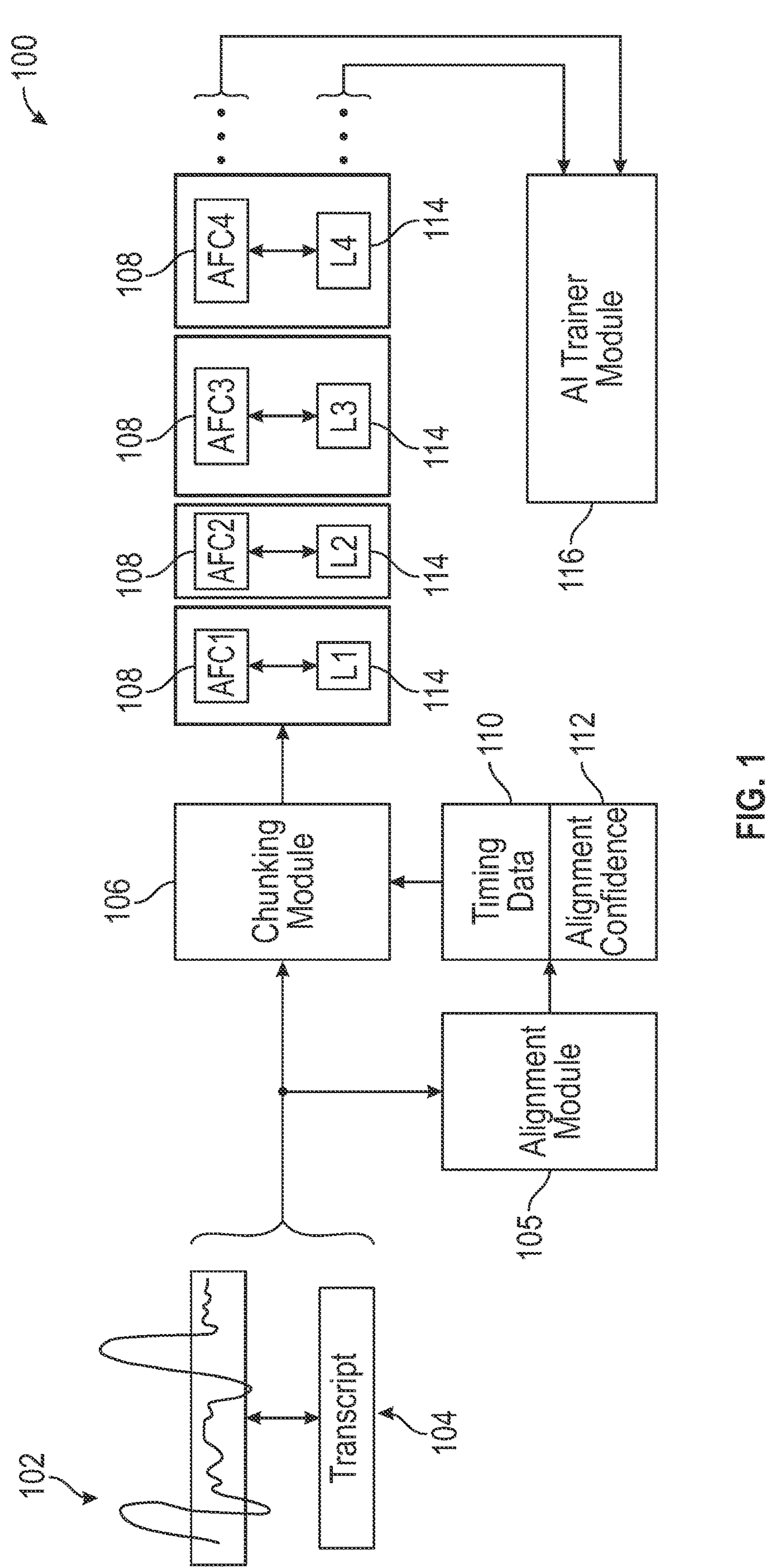
FIG. 1 illustrates a diagram of an environment, where AI training data is divided into chunks.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Supervised artificial intelligence (AI) networks and models rely on training samples to perform training and to learn how to perform their functions. Typically, training samples can include input and output pairs, where the training outputs are the expected outputs of the inputs. For example, in the context of artificial intelligence generation of transcript from audio, the training samples can include audio files as inputs, and the expected transcripts of the audio files as outputs. The AI models, used in transcript generation from audio files, receive as input a training sample audio file, and generate a transcript. Training of the AI model includes modifying the parameters of the AI model, until the model generates the expected transcript from a corresponding input audio file. The size of the training samples that can be processed through an AI model can be constrained by the hardware in which the AI model is expected to run. For example, central processing units (CPUs), graphical processing units (GPUs), and tensor processing units (TPUs) are among the example hardware, which can be used to run and train an AI model. AI hardware typically includes a limited amount of onboard memory, parallel processing bandwidth and other constraints, which can limit the size of the training data the hardware can process. The raw training data, on the other hand, can be of an incompatible size, relative to the capacity of the AI hardware.

For example, in the context of automatic speech recognition (ASR), or automatic AI-enabled transcription (ATS), raw training data can include audio files of two minutes or longer in length, while the AI hardware may be capable of processing only up to 10 or 20 seconds of audio in one training step.

Raw AI training data can be broken up into chunks that are more compatible with the capabilities of the AI hardware. For example, a two-minute training audio file can be broken into ten second chunks. The process of breaking up the raw AI training data into chunks can be referred to as "chunking." "Chunking" can also be performed for reasons unrelated to hardware, for example, to obtain better or more accurate results from the ASR or ATS models. Some AI algorithms perform better on smaller size data. The appropriate size of the chunks can be determined empirically, statistically, or by other methods. Furthermore, the chunks do not have to be of equal length. For example, a raw AI training audio sample file can be broken up in places, where further downstream efficiencies or accuracies can be obtained in the AI model(s), which are to process the training sample.

A raw training sample for an AI-enabled transcription system (ATS) includes an audio file and a transcript of the audio file. As an example, the audio file can be two minutes long. Chunking, therefore, for the purpose of generating hardware-suitable training samples, can include chunking both the audio file and the transcript of the audio file. A challenge in this scenario is to determine the portions of the transcript corresponding to an audio chunk. The described embodiments address this challenge where transcript portions corresponding to audio chunks can be determined, such that input/output training pairs can be generated and used to train an ATS. Some embodiments can include assigning timing labels to a transcript, such that when the audio is chunked, a corresponding transcript portion can be identified and used to generate audio/transcript pairs, as input/output training pairs. For example, when the described embodiments are used, if the audio is chunked from time zero to 10 seconds, a corresponding transcript portion can be identified, and the pair can be used as input/output training pairs. In this manner, some embodiments identify one or more alignments or mapping between the audio and the transcript by assigning timing labels to speech tokens in the transcript. The timing labels assigned to the speech tokens can be used to generate timing labels for words. Some embodiments include a measure of alignment confidence for the assigned timing labels. The alignment confidence can be used to chunk the audio file, where there is a higher likelihood of identifying a correct transcript portion from previous alignments between the audio and the transcript. Some embodiments include one or two stage alignments to improve the aligning or mapping of the audio to the transcript.

FIG. 1 illustrates a diagram of an environment 100, where chunking can be used to modify raw training data for an AI trainer module 116, in order to make the raw training data more suitable for hardware and/or to provide training data that yields more efficiencies. Regardless of the purpose of chunking, a challenge presented by the process is to match the audio chunks with transcript portions. Raw training data can include audio file 102 of a relatively large duration, for example two minutes or longer, and a transcript 104 of the audio file 102. In other words, the audio file 102 and the transcript 104 are the known input/output pairs, which can be used in training of an AI model. Notably, the audio file 102 and the transcript 104 typically do not include any alignment, mapping, or timing information. For example, the words in the transcript 104 do not include any beginning time and end time, relative to the audio file 102. The described embodiments can be used to predict timing data for the words or other units of speech in the transcript 104, relative to the audio file 102.

The transcript 104 can also be referred to as the "labels," or "expected outputs," for the audio file 102. Once trained with input/output training samples, an AI model can "label" an audio file. "Labeling," in this context, refers to the AI model generating a transcript for an audio file, whose transcript is unknown. The pool of training data can include several hundred, thousands, millions, or more of the audio files 102 and the corresponding transcripts 104. However, as described earlier, the audio files 102 can be of a length that may be incompatible for processing in the available AI hardware, designated for processing an AI model. Furthermore, the audio file 102 and the transcript 104 are typically received without any alignment information. In other words, the audio file 102 and the transcript 104 do not contain any information as to which portion of the transcript 104 corresponds to various timestamps in the audio file 102. The described embodiments include systems and methods for generating alignment data and matching between the words, or other units of audio or speech in the audio file 102, and the corresponding units in the transcript 104.

A chunking module 106 can use the alignment data to break up an audio file 102 into pairs of audio file chunks (AFCs) 108 and transcript portions (L #) 114. An alignment module 105 can provide the chunking module 106 with timing data 110. The timing data 110 can include data, such as the beginning time and end time of words in the audio file 102. Alternatively, or in addition, the timing data 110 can include timing data of other units of speech, such as phonemes. The timing data 110 can include an alignment, a matching or a pairing of units of audio in the audio file 102 and corresponding units in the transcript 104. For example, the timing data 110 can include words, and associated beginning and end time of the words. The words spoken in the audio file 102, may or may not be present in the transcript 104. For example, some audio files 102 can include audio in two or more languages. In some instances, the transcript 104 only includes transcript of one language. The alignment module 105 can also provide an alignment confidence 112 for each word, token, or other units of speech in the timing data 110. The alignment confidence 112 refers to a measure of likelihood of accuracy of a match between a unit of audio in the audio file 102 and a corresponding matched portion of the transcript 104.

In some embodiments, the alignment module 105 aligns the transcript 104 to the audio file 102, by assigning timing labels to the words, or other units of speech in the transcript 104. For example, when the unit of speech used is words, the alignment module 105 can assign timing labels to the words in the transcript, where the timing labels correspond to the beginning and end time of the word, spoken in the audio file 102. In other words, the alignment module 105 assigns timestamps to the words or other units of speech in the transcript 104, where the timestamps correspond to the same words or units of speech spoken in the audio file 102. The chunking module 106 can use the timing labels to assign transcript portions to the chunks derived from the audio file 102, effectively, generating audio chunks and transcript chunks.

In some embodiments, the chunking module 106 can generate audio file chunks (AFC) 108 by breaking up the audio file 102 between words or units of speech that have a higher alignment confidence 112. Furthermore, the timing data 110 can be used to determine corresponding transcript portions 114 to each audio file chunk 108. The audio file chunks can be of varying sizes. In some embodiments, to generate audio file chunks 108, the audio file 102 can be divided in timestamps, where the words flanking the endpoints at the division point have a high alignment confidence 112. The pairs of AFC 108 and transcript portions 114 can be provided to an AI trainer module 116 to use in the training of an AI model of an ASR and/or ATS.

Figure 2A:
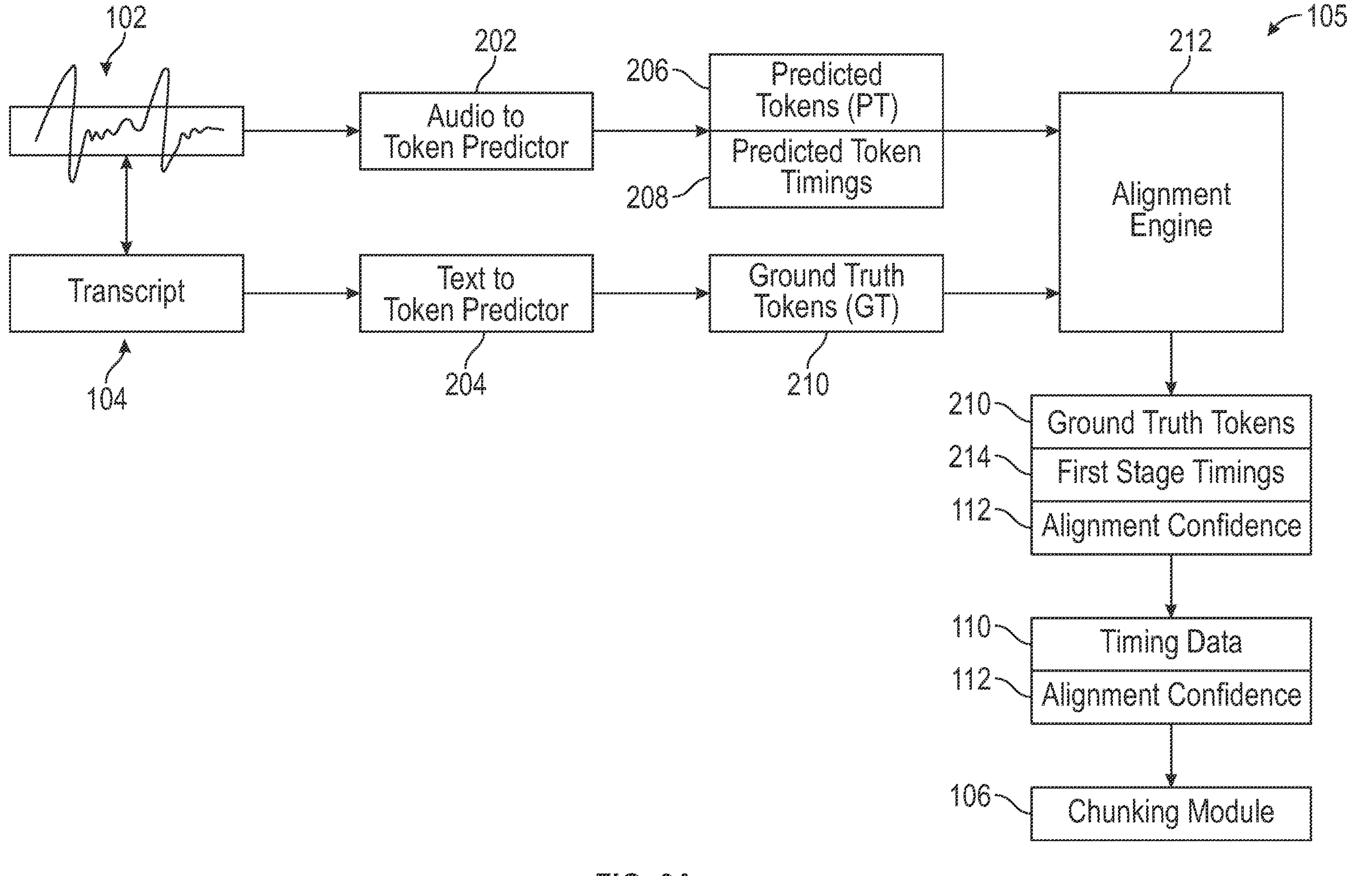
FIG. 2A illustrates a block diagram of an example implementation of an alignment module.

FIG. 2A illustrates a block diagram of an example implementation of the alignment module 105. An audio to token predictor 202 generates predicted tokens (PT) 206 from the audio file 102. In some embodiments, the tokens can be phonemes. In this scenario, the audio to token predictor 202 can be a phoneme model, or a phoneme predictor. Tokens can also be other units of speech, such as words. The audio to token predictor 202 can also generate predicted token timings 208 for the predicted tokens 206. In other words, the audio to token predictor 202 generates both predicted tokens and predicted timings for the predicted tokens. The predicted timings 208 can include beginning and end time of the tokens. In some embodiments, the audio to token predictor 202 can be implemented with a connectionist temporal classification (CTC) algorithm. The audio to token predictor 202 or a preprocessing module can convert the audio file 102 into audio features. Each audio feature can have an associated timestamp. The audio to token predictor 202 can predict a token in a vocabulary for every audio feature at each timestamp, thereby generating the predicted tokens 206 for each timestamp. The timestamps can serve as the predicted token timings 208.

The audio file 102 can have a token occurring in more than one timestamp. In other words, a token can span multiple timestamps. In this scenario, the audio to token predictor 202 can performs a collapsing algorithm, where similar tokens are collapsed into one to derive the beginning and end time of a token. For example, if the tokens are words, and the word "hello" is predicted at each timestamp t1, t2 and t3, the collapsing mechanism of the audio to token predictor 202 can collapse the token hello at t1, t2, t3, and determine an interval [t1, t3] as the time interval for the token "hello." In some embodiments, the conversion of audio file to audio features, the collapsing mechanism and/or other features of the audio to token predictor 202 can be implemented in separate modules.

A text to token predictor 204 can generate ground truth tokens 210 from the transcript 104. In some embodiments, where the tokens are phonemes, the text to token predictor 204 can be a grapheme to phoneme (G2P) model, predicting the phonetic pronunciation of the transcript 104. Both the predicted tokens 206 and the ground truth tokens 210 are from the same vocabulary.

An alignment engine 212 can map the predicted tokens 206 to the ground truth tokens, finding matches between the predicted tokens 206 and the ground truth tokens 210. The predicted tokens 206 and the ground truth tokens 210 can be in the form of sequences of integers. Alignment engine 212 can use a variety of alignment techniques for aligning the sequences, including methods that calculate costs for converting one sequence to another by a series of operations. The alignment engine 212 can choose the optimum series of operations, disregarding the cost measure and retaining the alignment yielded by the optimum or near optimum series of the operations. Example alignment techniques include calculating minimum Levenshtein distance, longest common subsequence distance, or the minimum Damerau-Levenshtein distance. The modified Levenshtein maximal match criterion can also be utilized.

After alignment engine 212 operations, the predicted token timings 208, associated with the predicted tokens 206, can be assigned to the corresponding matched ground truth tokens 210. Synthetic times can also be generated for unmatched ground truth tokens 210, using extrapolation, or other techniques. In this manner, the ground truth tokens 210 can have associated timing labels assigned to them. As the ground truth tokens 210 from the transcript 104 and the predicted tokens 206 from the audio file 102 are from the same vocabulary, the timestamped ground truth tokens 210 can be used to generate transcript portions 114 for the audio file 102. Furthermore, the timing labels, assigned to the ground truth tokens 210 can be used to derive timing labels for other units of speech. For example, in some embodiments, the tokens are phonemes. The timing labels associated with phonemes can be used to determine beginning and end times of words, thereby assigning timing labels to each word in the transcript 104. When the chunking module 106 breaks up the audio file 102 into audio file chunks 108, the assigned word timing labels to the transcript 104 can be used to determine the transcript portions corresponding to the audio file chunks 108, thereby generating the transcript portions 114. The pairs of audio file chunks 108, and transcript portions 114 can be used as known input/output pairs in training an AI model. Furthermore, the time-stamped ground truth tokens 210 can be used as training data for the audio to token predictor 202. The assigned timing labels to the ground truth tokens 210 can be referred to as first stage timings 214, as some embodiments can perform multi-stage alignments, each alignment improving the alignment of the previous stages.

In some embodiments, the operations of the alignment engine 212 can also include generating the alignment confidence 112 for each mapping of the predicted tokens 206 and the ground truth tokens 210, as well as for synthetic or derived times. The first stage timings 214 are timing information for each token. The first stage timings 214 can be used to generate the timing data 110 for other units of speech, for example words. In some embodiments, where the tokens are phonemes, the first stage timings 214 can relate to the timing information of phonemes and the timing data 110 can be timing data of words, generated from the first stage timings 214. In other words, the first stage timings 214 may relate to a unit of speech (e.g., phonemes), and the timing data 110 can relate to another unit of speech (e.g., words). For example, the timing data 110 can include, beginning and end time of each word. In other embodiments, timing data 110 can be the same as the first stage timings 214. The timing data 110 and the alignment confidence 112 are forwarded to the chunking module 106 to be used in dividing the audio file 102, as described above.

Figure 2B:
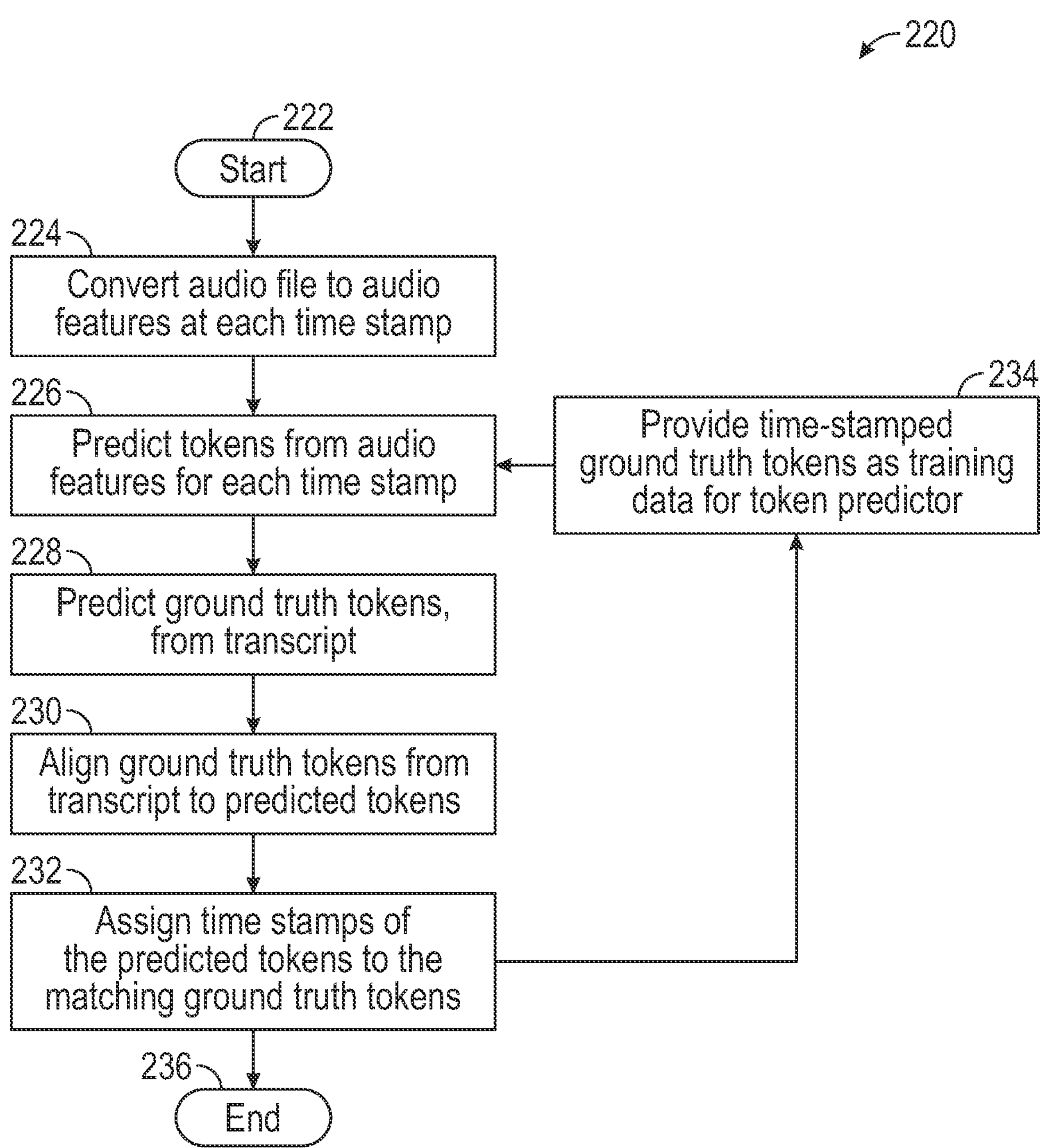
FIG. 2B illustrates a flowchart of a method of an example operation of an alignment engine in some embodiments.

FIG. 2B illustrates a flowchart of a method 220 of an example operation of the alignment engine 212 in some embodiments. The method starts at step 222. At step 224, the audio file 102 can be converted to audio features, at timestamps. In other words, the audio file can be divided into timestamps, and the analog audio signal at each timestamp is converted to a numerical representation referred to as "audio feature." In some implementations, the step 224 can be implemented by generating a spectrogram of the audio file 102. At step 226, the audio to token predictor 202 can predict a token for each audio feature at each timestamp. The timestamp can be timing labels for the predicted tokens. In this manner, predicted tokens 206 and the predicted token timings 208 are generated. In some embodiments, a phoneme predictor model performs the step 226. At step 228, the text to token predictor 204 predicts ground truth tokens 210 from the transcript 104. In some embodiments, the text to token predictor 204 is a grapheme-to-phoneme (G2P) model, which estimates the phonetic pronunciation of the text in the transcript 104.

At step 230, the alignment engine 212 performs alignment between predicted tokens 206 and the ground truth tokens 210. The alignment engine 212 operations can include finding a plurality of alignments and choosing an optimum alignment. The alignment engine 212 can perform alignment using various techniques, including for example, calculating minimum Levenshtein distance, longest common subsequence distance, or the minimum Damerau-Levenshtein distance. The modified Levenshtein maximal match criterion can also be utilized. Some alignment techniques include finding a plurality of alignments, each with an associated cost function. When an optimum or near optimum alignment is chosen using the cost function, the cost function can be disregarded, and the corresponding alignment can be used to map the ground truth tokens 210 to the predicted tokens 206.

The predicted tokens 206 each have an associated timestamp, while the ground truth tokens 210 do not include any timing information. At step 232, the predicted token timestamps can be assigned to the matching ground truth tokens, determined from the step 230. At step 234, the time-stamped ground truth tokens can be used as training data for the audio to token predictor 202 to improve its prediction accuracy. In other words, steps 226, 230, 232 and 234 can be iteratively performed to improve the prediction accuracy of the audio to token predictor 202. The time-stamped ground truth tokens can be used to derive timing data 110 for other units of speech in the audio file 102. The timing data 110 can be forwarded to the chunking module 106. The method ends at step 236.

The predicted tokens (PT) 206 and the ground truth tokens (GT) 210 can each be a sequence of Integers. In some embodiments, the alignment engine 212 can perform an alignment between the predicted tokens (PT) 206 and the ground truth tokens (GT) 210, as a whole. In other embodiments, the alignment engine 212 can perform alignment between the predicted tokens 206 and the ground truth tokens 210, segment by segment. While it is possible to perform an alignment of an entire sequence of PT 206 and GT 210, a whole sequence alignment can be, in some cases, inefficient and/or inaccurate. Several factors can contribute to the inefficiency and inaccuracy of the whole sequence alignment. For example, the cost of whole sequence alignment, for some alignment algorithms, is in the order of n^3, where "n" is the number of tokens. Furthermore, errors in the transcript and ground truth sequence and/or in the predicted tokens, including deletion, insertion and replacement errors can affect the result of the alignment negatively. Some audio files 102 include multiple language, while their associated transcripts 104 only includes transcription of one of the languages spoken in the audio. Performing segment by segment alignment between the PT 206 and the GT 210 can address these challenges.

In some embodiments, the alignment engine 212 utilizes a sliding window with overlap to align the PT 206 and the GT 210, segment by segment. When segments of fixed size are chosen, the alignment cost does not grow with the overall size of the audio file 102, or by the overall tokens in the audio file 102, instead, the alignment cost is approximately linear, corresponding to the number of tokens in each segment. Various alignment algorithms can be utilized to perform alignment in each segment, including for example, calculating minimum Levenshtein distance, longest common subsequence distance, or the minimum Damerau-Levenshtein distance. The modified Levenshtein maximal match criterion can also be utilized. In some embodiments, the alignment engine 212 performs multiple stage alignments, where subsequent alignments improve prior stage alignments.

In some embodiments, a multistage alignment can be used, where each stage improves the prior stage alignment to further increase the accuracy of assigning timestamps to the transcript 104. For example, an embodiment, performing a two-stage alignment will be described, however, more than two stages can also be used.

In an embodiment utilizing a two-stage alignment, the first stage can use inference to supply token timings derived from the audio file 102. The ground truth tokens 210, derived from the transcript 104 can be aligned with the predicted tokens 206, derived from the audio file 102, in a segment-by-segment approach. A sliding window or sliding segment of fixed size can be moved along the predicted tokens 206 sequence and the ground truth tokens sequence 210, performing alignment for the tokens in the segment, assigning timing labels from matched predicted tokens 206 to the ground truth tokens 210. Unmatched ground truth tokens 210 can be assigned synthetic timing labels, based on extrapolation, statistical, or other techniques.

The sliding window is moved along with some selected overlap, where not all alignments in the sliding window are retained. The overlap allows detecting corrupted inputs from the predicted tokens 206, or from the ground truth tokens 210, including for example, long sequences of missing tokens and erroneous inserts. The alignment engine 212 can skip corrupted inputs, when the ground truth tokens 210 sequence does not match predicted tokens 206. The impact of corrupted input can be mitigated by assigning a low alignment confidence 112 to them. Some examples of the corrupted input scenario can occur when audio file 102 contains multiple languages, and scenarios, where the transcript 104 includes additional non-transcript text, and descriptors that do not have a corresponding audio portion. Examples of non-transcript text include captions and headers in a transcript 104.

First Stage Alignment

Figure 3A:
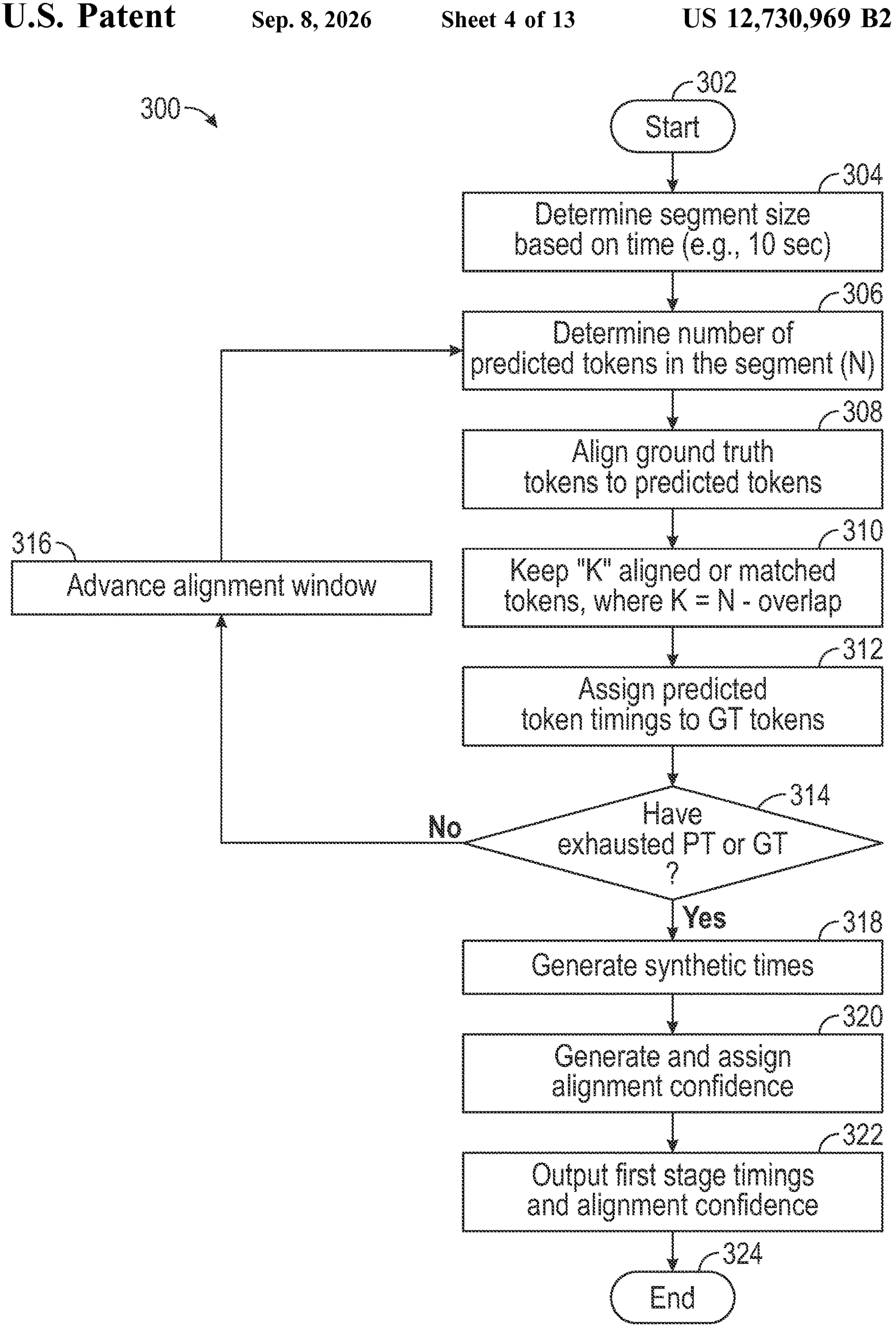
FIG. 3A illustrates a flowchart of a method of an example of the operations of a first stage alignment in some embodiments.
Figure 3B:
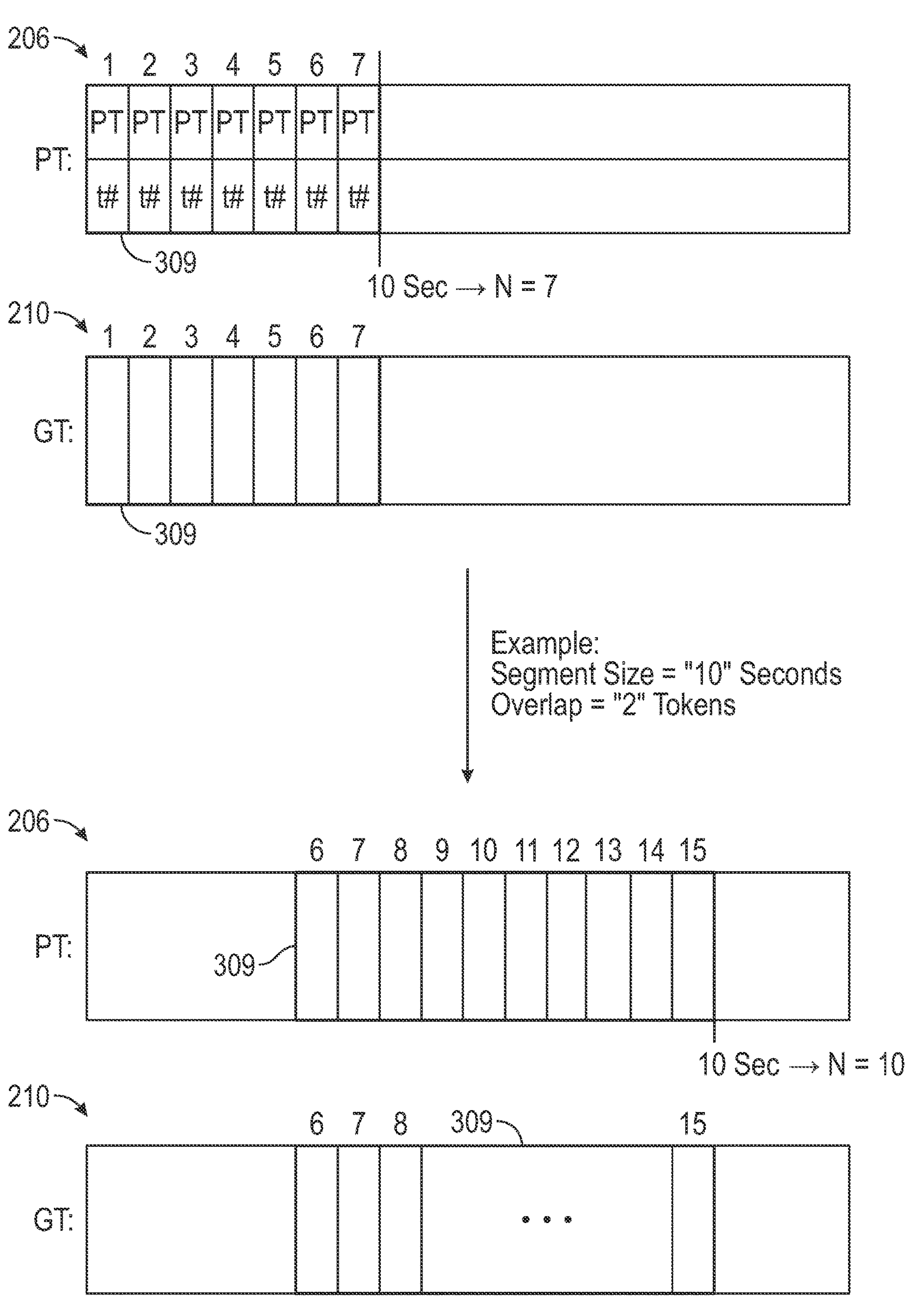
FIG. 3B illustrates snapshots of two example positions of a sliding alignment window moving across the predicted tokens 206 sequence and the ground truth tokens 210 sequence.

FIG. 3A illustrates a flowchart of a method 300 of an example of the operations of the first stage alignment in some embodiments. FIG. 3B illustrates snapshots of two example positions of a sliding alignment window moving across the predicted tokens 206 sequence and the ground truth tokens 210 sequence. Referring to both FIGS. 3A, 3B, the segment size can be selected first and is a fixed parameter during the operations of the method 300. The method starts at step 302. At step 304, a segment size is selected. The segment size can be based on a selected time interval. For example, in one embodiment, the segment size can be "10" seconds. An optimum segment size can be determined empirically, based on statistical techniques, or based on other techniques. Alignment, using a small segment size, can run in linear time and cost, but a very small segment can lead to inaccurate alignment, and an inability to perform alignment, when multiple deletions are present in the predicted tokens in the PT 206 sequence, or the ground truth tokens in the GT 210 sequence. Conversely, alignment, using a very large segment size, can incur performance penalties and costs, such as running cubical cost, similar to aligning whole sequences. In other words, the segment size has to be small enough to yield a better runtime cost function, but large enough to include enough tokens for performing a relatively accurate alignment between the two sequences. In some embodiments, the alignment performance can be measured by some statistical techniques, relative to various selected segment sizes. The segment size yielding a high or optimum alignment performance can be used in subsequent alignment operations.

At step 306, the number of predicted tokens in the PT 206 sequence for the selected segment size is determined. The number of tokens in a segment can be denoted by a parameter "N," corresponding to the index of the last token in the selected segment. As an example, the number of tokens N in a segment can be "7." Each token in the PT 206 sequence has a corresponding predicted token time "t #." The predicted token time can include a start time and end time of the token in the audio file 102 (e.g., t #=[t1, t2]). During alignment, the predicted token timings "t #" can be assigned to the matched tokens from the GT 210.

At step 308, the same number of tokens determined at step 306 are selected from the GT 210 sequence, and are aligned with the predicted tokens from the PT 206 sequence for the same segment. In other words, the ground truth tokens from the beginning of the segment (e.g., the first token) to the last token in the sequence (e.g., the "Nth" token) are aligned to the predicted tokens from the first to the last token (e.g., from the first token to the "Nth" token). Various alignment algorithms can be used. Example alignment techniques include calculating minimum Levenshtein distance, longest common subsequence distance, or the minimum Damerau-Levenshtein distance. The modified Levenshtein maximal match criterion can also be utilized. Some of the alignment algorithms can yield a measure of cost in terms of the number of the required operations (addition, deletion, and replacement) to convert one sequence to another. The alignment engine 212 can ignore the cost measure, and retain the yielded correspondences, mappings, or alignments, between the two sequences.

The segment by which alignment is performed can be considered a sliding alignment window 309 that is moved along both the PT 206 sequence and the GT 210 sequence, segment by segment, with some overlap relative to the prior segment. The size of the alignment window 309 is the segment size, based on time or number of tokens. When alignment for a segment is performed, the alignment window 309 is moved along the PT 206 sequence by an amount slightly smaller than the segment size. For example, the alignment window 309 can be moved by an amount equal to the segment size minus a selected overlap. For example, when the segment size is "10" seconds, and the overlap is chosen to be "2" seconds, the alignment window 309 can be moved by 8 seconds, along the PT 206 sequence. Alternatively, the overlap can be chosen based on a selected number of tokens (e.g., "2" tokens). In this scenario, the alignment window 309 is advanced by the number of tokens in a segment minus the overlap. For example, for N=7 and an overlap of "2" tokens, "5" matched or aligned tokens are kept and the next alignment window 309 can start from token No. "6" up to a number of predicted tokens in the PT 206 sequence, making up the next segment size (e.g., "10" seconds in the PT 206). The alignment window 309 moves along the GT 210 sequence by the same amount of overlap, relative to the prior position of the window 309.

At step 310, a selection "K" of the aligned or matched tokens are retained. In some embodiments, the first "K" aligned tokens in a segment are retained and the remainder of the alignments are discarded to yield an overlap for the sliding alignment window 309. In other words, the alignments falling in the overlap region are discarded. The first tokens in the alignment window 309 are kept and the aligned tokens in the overlap region are discarded. The retained tokens are given by Equation (1).

$$K = N - \text{overlap} \qquad \text{Equation (1)}$$

In the next iteration of method 300, and for a subsequent segment along the GT 210 sequence, the alignment window 309 starts at the index of the last token retained plus one, or the first token in the previous iteration's overlap region. As an example, if a segment size of "10" seconds yields "7" tokens to align, and an overlap of "2" tokens is selected, the alignment window 309 is advanced by only "5" tokens.

When the overlap is selected based on time, the number of tokens in the overlap region in the PT 206 sequence can be determined, and the same number of tokens can be used when advancing the alignment window 309 along the GT 210 sequence. When the overlap is time-based, the number of tokens in overlap region can vary from segment to segment when advancing the alignment window 309.

In some scenarios, the PT 206 sequence and the GT sequence 210 include large runs of deletions and insertions relative to one another. For example, when the audio file 102 includes multiple languages, while the transcript 104 only includes transcription of one of the languages spoken in the audio, the predicted tokens in the PT 206 sequence can include many predicted tokens (insertions) that do not have an corresponding token in the ground truth tokens in the GT 210 sequence (deletions). In other scenarios, corrupted input can yield insertion or deletion errors in the PT 206 and/or the GT 210 sequences. In these and similar scenarios, the method 300 includes detecting long insertion and deletion runs and skipping them when advancing the alignment window 309 or when performing alignment in the step 308. In other words, alignment is only performed for the reliable portions of the PT 206, and the GT 210 sequences.

At step 312, the predicted token times t #, associated with the matched tokens in the PT 206 sequence are assigned to the matched ground truth tokens in the GT 210 sequence. In other words, once matching tokens from the two sequences PT 206 and GT 210 are determined, the timing information associated with the matched tokens in the PT 206 sequence are assigned to the matched tokens in the GT 210 sequence. In other embodiments, the assignment of the predicted token times t# to the matched tokens in the GT 210 sequence is performed as soon as a match is determined. The predicted token times t# are the same as the predicted tokens 208, as described in relation to the embodiment of FIG. 2A.

At step 314, it is determined whether all tokens in the PT 206 sequence or the GT 210 sequence are exhausted. If not, the method moves to step 316, where the alignment window 309 is advanced by the segment size minus the selected overlap. The method then moves to step 306, where the number of predicted tokens, in the PT 206 sequence, in the segment size are redetermined. The number of tokens in each segment can be different from the previous iterations of the method 300. While the segment in each iteration is of fixed size (e.g., "10" seconds of audio), the number of tokens in each segment, in each iteration can be different. For example, the first "10" seconds of audio can include 7 tokens, while the second "10" seconds of audio can include "10" tokens, and the third "10" seconds of audio can include only "5" tokens in the PT 206 sequence, and so forth. In other embodiments of the first stage alignment, the segment size can be variable.

The method can continue iterating until the decision step 314 determines that either of the sequences PT or GT 206, 210 are exhausted. The method then moves to step 318. Once all tokens that can be matched using steps 306-312 are matched, any unmatched ground truth token can be assigned a synthetic time, by for example, techniques such as extrapolation, statistical techniques, or others. In the example shown, the step 318 is performed after alignment in all segments. However, in other embodiments, the step 318 can be performed before step 314 for each segment. In other words, once an alignment for a segment is completed, synthetic times can be generated and assigned for unmatched ground truth tokens in that segment, based on extrapolation, statistical, or other techniques.

At step 320, alignment confidence 112 is generated and assigned for each matched token, based on a confidence measure of the accuracy of the alignment of a matched ground truth token from the GT 210 sequence to a predicted token in the PT 206 sequence. Various techniques can be used to generate the alignment confidence 112. For example, when tokens are phonemes, the alignment confidence for each word in the transcript can be calculated as the fraction of phonemes which matched for that word when aligning the GT 210 sequence and the PT 206 sequence. The same technique can be applied to tokens, other than phonemes. Synthetic times can be assigned a low alignment confidence 112. Another technique for generating the alignment confidence 112 includes generating the alignment confidence 112, based on a probability density function (PDF) for the predicted tokens. The chunking module 106 can avoid dividing the audio file 102 between the words that are derived from tokens having low alignment confidence 112. The step 320 can encompass detecting deletion, insertion, and/or replacement errors between the GT 210 sequence, and the PT 206 sequence, reflected in the alignment confidence 112. In other words, portions of the transcript 104 that lack correspondence to the audio file 102, can be detected via low alignment confidence which was assigned based on deletion or insertion errors detected between the GT 210 sequence, and the PT 206 sequence. Similar to step 318, in some embodiments, the step 320 can be performed for each segment, when the alignments for the segment are determined. Still in other embodiments, a hybrid approach can be used, where the parameters generated or determined in steps 318 and 320 are determined segment by segment but improved or modified at the end of aligning all segments.

At step 322, the predicted token times t# and their corresponding assigned ground truth tokens from the GT 210 sequence, as in step 312, and the synthetic times generated at step 318, can be outputted as the first stage timings 214. Alignment confidence 112, generated at step 320, for each ground truth token in the GT 210 sequence can also be part of the output of the step 322. The method ends at step 324.

Second Stage Alignment

Figure 4:
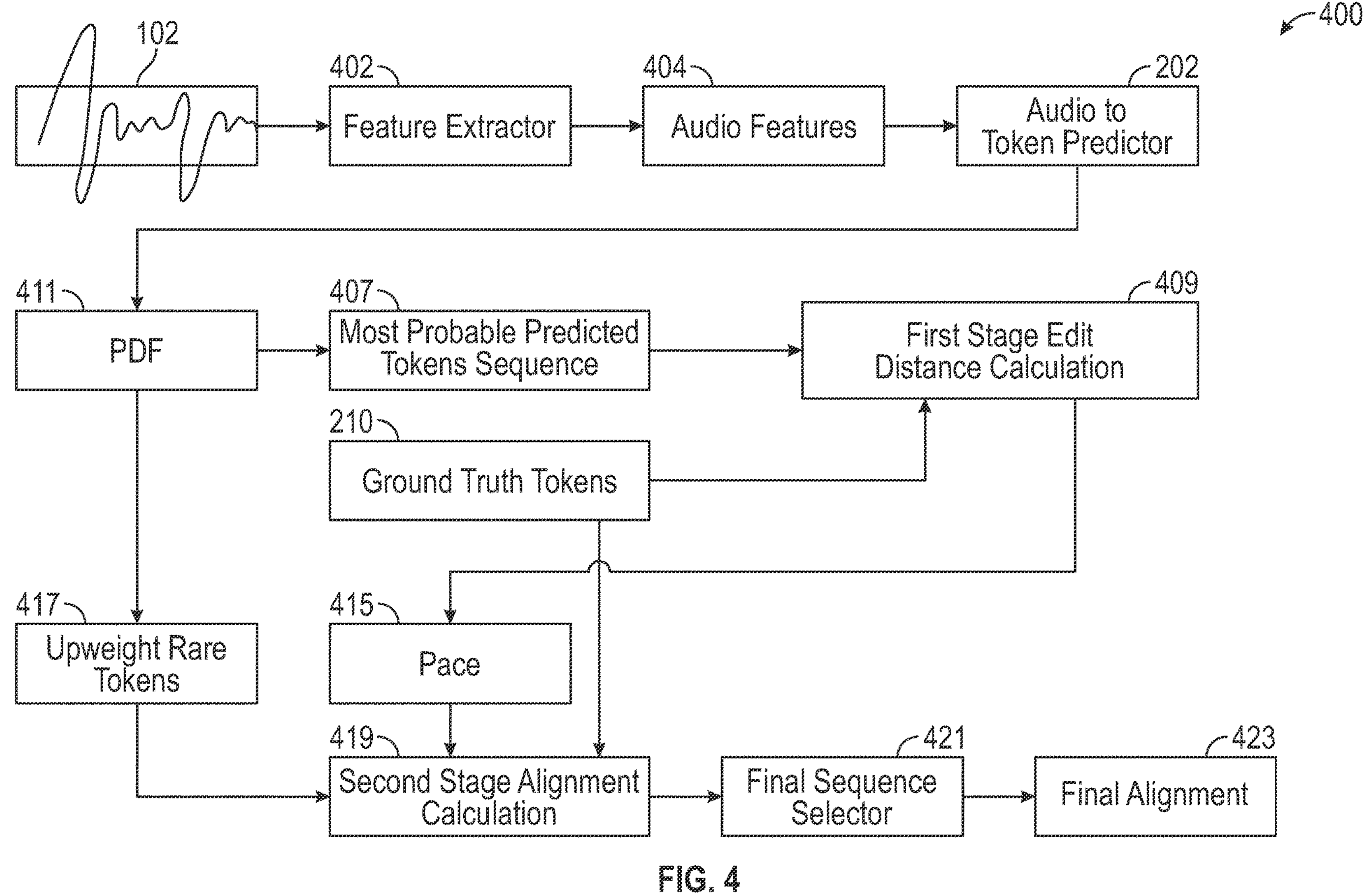
FIG. 4 illustrates a block diagram of an example second stage alignment operations.

The first stage timings 214 can be used to generate the timing data 110. However, in some embodiments, the first stage timings 214 can further be improved by performing a second stage alignment. FIG. 4 illustrates a block diagram 400 of the second stage alignment operations. While various modules are shown, not all modules need to be implemented separately. Some modules and their associated functionality can be combined or further separated into fewer or more modules. A feature extractor 402 can convert the audio file 102 into audio features 404. Various feature extractors 402 can be used. For example, in some embodiments, the feature extractor 402 is a frequency-based feature extractor, and the audio features 404 can be a spectrogram. Regardless of the type of feature extractor 402 used, the audio features 404 can be a sequence of audio features at various time-steps.

An audio to token predictor 202 can output a probability density function (PDF) 411, which can produce a probability for each token in the vocabulary at each time step. Therefore, the PDF 411 can be a matrix of numbers between 0 and 1, with dimensions T, and V, where T is the number of time steps and V is the size of the vocabulary (e.g., number of possible tokens). A predicted sequence of tokens from the PDF can be generated by outputting the most probable predicted token at each time step, and then applying a CTC collapse to the resulting token sequence. In some embodiments, the most probable predicted tokens sequence 407 can be processed by a collapsing module and/or a collapsing algorithm. The results are used to generate the first stage alignment. In some embodiments, the first stage alignment can include first stage alignment edit distance calculations 409. The first stage alignment and/or the first stage edit distance calculations 409 are also in part generated by utilizing the ground truth tokens 210, as described above in relation to the embodiments of FIGS. 1-3

An example collapsing module can detect repetitive tokens, occurring in the most probable predicted tokens sequence 407 and collapse them into single tokens. For example, predicted tokens, when tokens are characters, can include "h h h h e e l l l l o," where each character in the sequence is a prediction of a token for a timestamp. As illustrated in this example, a token can stretch along multiple times stamps. The collapsing module can collapse the repetitive tokens into single tokens, generating the predicted tokens "h e l l o." To avoid collapsing two tokens in a row that are supposed to be maintained as separate tokens, the audio to token predictor 202 can be trained to generate a "blank character" between those tokens. For example, the word "hello," from audio features 404 can be mapped to tokens, "h h h h e e l l epsilon l l l o o," where epsilon denotes the "blank character." The collapsing module, and/or a collapsing algorithm does not collapse the tokens flanking the "blank character." Table (1) illustrates an example of a portion of a predicted tokens sequence from timestamp, "t1" to timestamp "t10," where tokens in this example are characters.

TABLE 1

| t1 | t2 | t3 | t4 | t5 | t6 | t7 | t8 | t9 | t10 |
|---|---|---|---|---|---|---|---|---|---|
| h | h | h | e | E | l | epsilon | l | l | o |

Table (2) illustrates an example of the portion of the predicted tokens sequence illustrated in Table (1), after the operations of the collapsing module and/or the collapsing algorithm.

TABLE 2

| [t1, t3] | [t4, t5] | [t6, t7] | [t8, t9] | t10 |
|---|---|---|---|---|
| H | e | l | l | o |

In some embodiments, the predicted sequence of tokens may not be exactly the same as the ground truth tokens 210. In this scenario, the alignment algorithm can use the full PDF in the second stage alignment algorithm.

An alignment algorithm, according to some embodiments, can have two stages. In some embodiments, the first stage uses an edit distance matching between the predicted sequence of tokens and the ground truth sequence of tokens. This can be used to set a "pace" 415 for the second stage alignment operations. The second stage alignment can find the most probable CTC path, with constraints on allowed paths imposed by the pace 415. These operations will be described below.

The first stage alignment can efficiently find an approximate alignment (e.g., a mapping between the ground truth tokens and the time steps), by matching tokens in the predicted sequence to tokens in the ground truth sequence. In some embodiments, an edit distance algorithm such as Levenshtein distance can be used. For larger sequences, a heuristic may be used to "chunk" the sequences and perform edit distance matching chunk-by-chunk, in order to improve the efficiency and scaling properties of the first stage alignment. In some embodiments, the heuristics or modifications to the edit distance calculation can be used to make the alignment less sensitive to missing blocks of tokens in either the predicted or ground truth sequence, since these missing blocks can be common in practice.

The approximate alignment output by the first stage, or the first stage edit distance calculations 409 can be used to set a pace 415 that can be used to constrain the alignment output by the second stage (the second stage alignment calculations 419). For example, the approximate alignment output by the first stage (the first stage edit distance calculations 409) and the alignment output by the second stage (second stage alignment calculations 419) each can produce different mappings between the time steps and the ground truth tokens 210. If the first stage alignment maps time step "t" to ground truth token "s1," and the second stage alignment maps the same time step "t" to ground truth token "s2," the second stage alignment can be constrained, such that the distance between "s1" and "s2" in the ground truth sequence is not any larger than "n," where "n" is a pace parameter (pace 415) of the second stage alignment algorithm.

In the second stage alignment, the most probable token at each time step can be found, with applying some constraints and modifications. The constraint and modifications will be described below. In some embodiments, one modification includes upweighting the probability of rarer tokens in the PDF (upweight rare tokens 417). "Rare" refers to a token that occurs less frequently in the ground truth sequence. For example, if tokens were words in the English language, then "a" and "the" would be common tokens in most English sentences, whereas an uncommon word that only occurs once a sentence or paragraph would be a "rare" token. The second stage alignment algorithm can be modified to match rare tokens more closely because they will be more localized in the PDF, whereas absent upweighting the rare tokens step 417, it can be easier for the second stage alignment algorithm to confuse two different but nearby instances of the same token (e.g., the word "the" in the sentence "the top of the table").

In some embodiments another modification is that the sequence of tokens output over all time steps are CTC collapsed to the ground truth tokens sequence. To achieve this result, the time steps are traversed from left to right (or from beginning to end) and a fixed number of "prefixes" that have a high total probability are maintained. A prefix can be a sequence of tokens that the CTC collapses to a prefix of the ground truth token sequence. For example, if the ground truth token sequence is ["h", "e", "1", "1", "o"], then the following sequence may be a prefix: ["h", "h", epsilon, "e", "1", "1", epsilon, "1"] because the latter sequence, the CTC collapses to ["h", "e", "1", "1"], which are the first four tokens of the ground truth sequence. (In this case, the first four tokens of the ground truth tokens sequence are selected as the prefix parameter). As time steps are traversed from left to right (or from beginning to end), there can be multiple sequences that collapse to the same prefix. For each prefix, a small number of representative sequences that have the highest total probability can be maintained, or selected as the result of the alignment.

In some embodiments, a third modification includes discarding prefixes that do not keep the pace parameter described above. as time steps are traversed from left to right (or from beginning to end).

In some embodiments, a fourth modification includes allowing for a time step to map to multiple tokens. This can be desirable in cases where there is likely to be "token impaction". Token impaction occurs when tokens are spoken at a rate such that multiple tokens fit into a single time step. Token impaction is more likely in cases when the number of tokens in the ground truth tokens sequence is close to or exceeds the number of time steps. Once the time steps are traversed from left to right (or from beginning to end), the sequences that the CTC collapses to the ground truth tokens sequence are maintained, and the sequences that still only collapse to the prefixes of the ground truth tokens sequence are discarded. A single sequence with the highest total probability, which produces a mapping between the time steps and the ground truth tokens, are selected (the final sequence selector 421), and is output as the final alignment (final alignment 423).

Second Stage Alignment Example Method

Figure 5:
FIG. 5 illustrates a flow chart of an example second stage alignment method.
Figure 5:
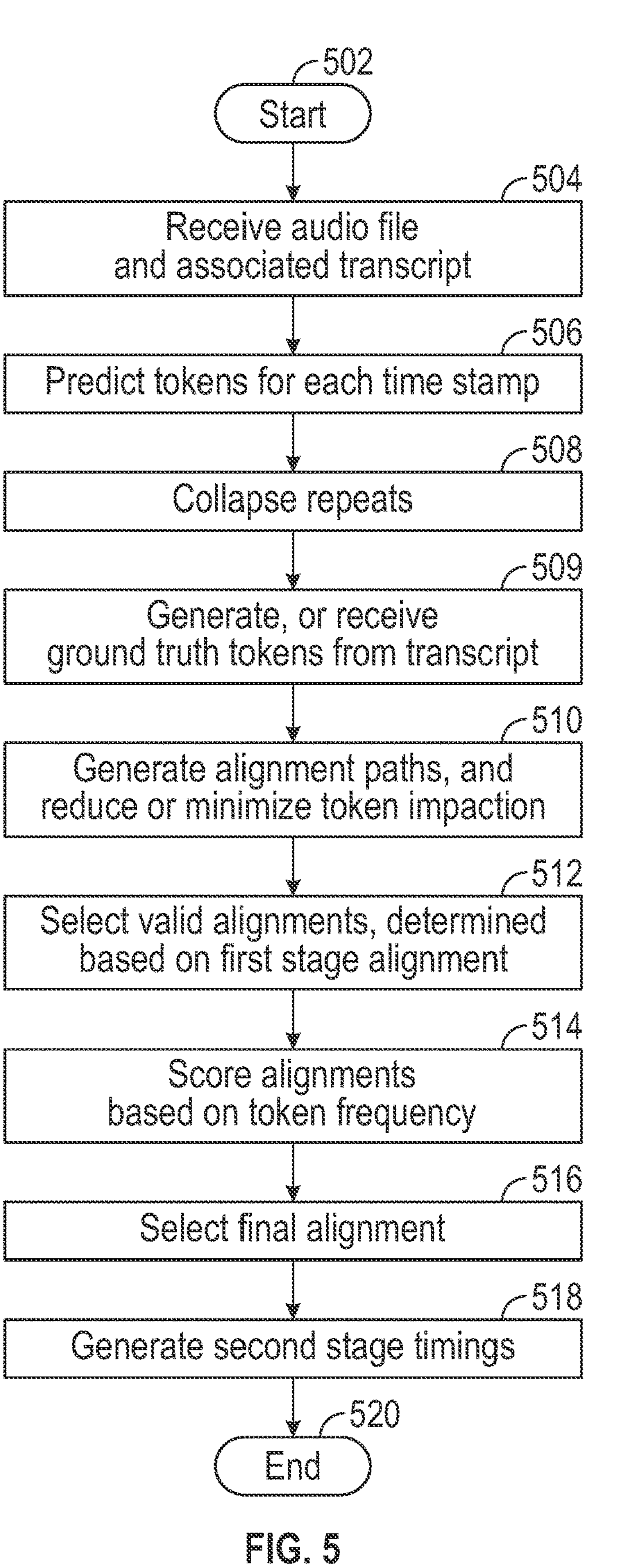

FIG. 5 illustrates a flow chart of an example second stage alignment method 500. The method starts at step 502. At step 504, an audio file 102 and an associated transcript 104 are received. The audio file 102 can be converted to audio features 404. The audio features each have a timestamp. At step 506, each audio feature 404 can be mapped to a token in a vocabulary of tokens, thereby predicting a token for each timestamp. At step 508, the repeat tokens are collapsed. The step 508 includes not collapsing identical tokens flanking a blank token to account for repeat tokens corresponding to non-erroneous repeat tokens. At step 509, ground truth tokens 210 are generated from the transcript 104. Alternatively, the ground truth tokens 210 are received from the alignment operations previously performed. For example, the first stage alignment operations include generating the ground truth tokens 210.

At step 510, alignment paths are generated between the predicted tokens, derived from the step 506, and the ground truth tokens, derived from the transcript 104. Token impaction is detected and reduced or minimized. When the pace of the tokens in the audio file 102 is faster than the resolution of the audio to token predictor 202, the alignments in step 510 can be generated by skipping the impacted tokens. In some embodiments, this is achieved by assigning the timing of the first predicted token to the impacted tokens.

At step 512, a set of valid alignments are selected, based on the first stage alignment. The first stage alignment yields first stage timings 214, which can in turn yield the pace 415. Given the constraint of the pace 415, not all potential alignments are valid. The invalid alignments can be excluded from the subsequent second stage alignment operations. At step 514, the valid alignments can be scored, based on token frequency. Token frequency can be derived from the first stage timings 214. In some embodiments, the scoring is based on token rarity, where the less frequent tokens are scored higher in the alignment than the more frequent tokens. At step 516, a final alignment, based on the alignment scores generated in step 514, is selected. At step 518, second stage timings are outputted, based on the final alignment, selected in step 516. The second stage timings 422 are token timings and can be used to generate timing data 110 for other units of speech, such as word timings. The method ends at step 520.

Example Alignment Methods

The described alignment systems and methods can be used to derive other alignment techniques. For example, in some embodiments, some alignment method steps or alignment system modules can be eliminated. In other embodiments, some alignment method steps or alignment system modules can be combined. Below some example methods of alignment according to various embodiments will be described. Persons of ordinary skill in the art can envision variations and other combinations derived from the described alignment techniques without departing from the spirit of the disclosed embodiments.

Figure 6:
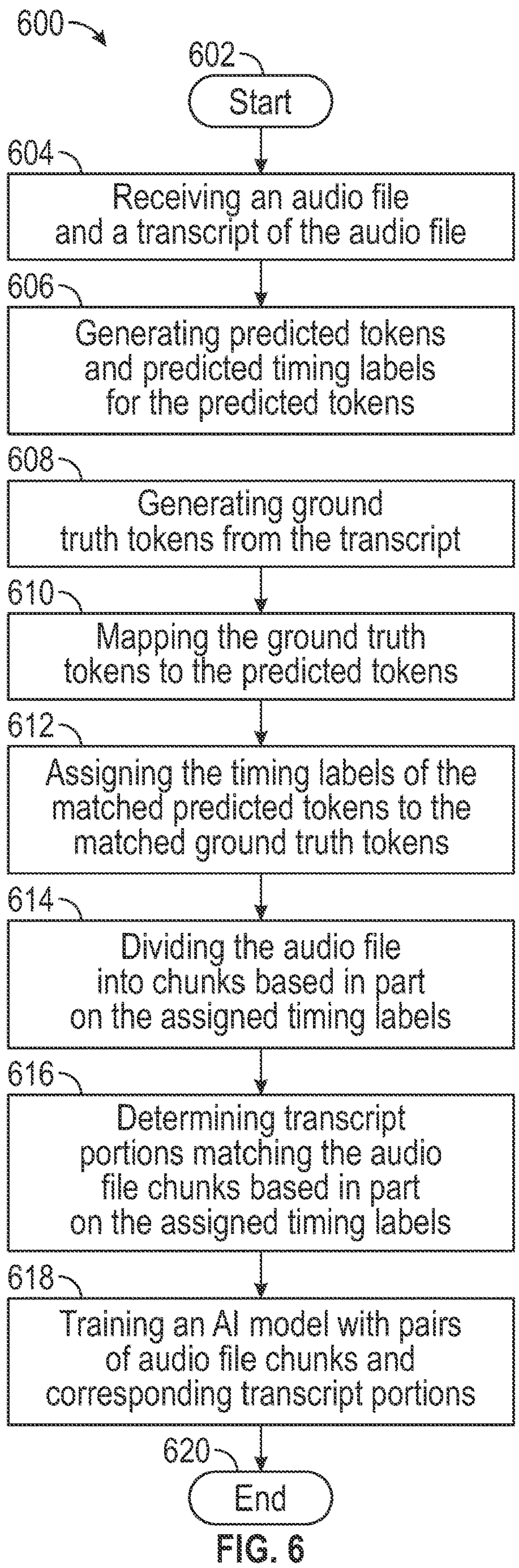
FIG. 6 illustrates a flowchart of an alignment method, according to an embodiment.

FIG. 6 illustrates a flowchart of an alignment method 600, according to an embodiment. The method starts at step 602. Step 604, includes receiving an audio file 102 and an associated transcript 104 of the audio file 102. Step 606 includes generating predicted tokens 206 and predicted timing labels for the predicted tokens 206. In some embodiments, predicting the timing labels can be accomplished by predicting a token from a vocabulary for time stamps along the audio file 102. Step 608 includes predicting ground truth tokens from the transcript 104. Step 610 includes mapping or aligning the ground truth tokens 210 to the predicted tokens 206, finding matched predicted tokens and corresponding matched ground truth tokens. In some embodiments, the mapping or alignment in step 610 can be performed segment by segment, using a sliding alignment window. The sliding alignment window is advanced along the predicted token 206 sequence and the ground truth tokens 210 sequence, where the tokens in the alignment window from the two sequences are matched. In some embodiments, the alignment window is advanced with some amount of overlap, relative to the previous position of the sliding window. The advancement with overlap amounts to keeping a subset of the aligned tokens and discarding the alignments in the overlap region. Additionally, long runs of tokens in one sequence, without corresponding tokens in the other sequence can be skipped. The long runs can be due to information present in one sequence, but not the other (e.g., when the audio file includes multiple languages, but the transcript includes only transcription of one language).

Step 612 includes assigning the timing labels of the matched predicted tokens to the matched ground truth tokens. Since the ground truth tokens are derived from the transcript 104, assigning timing labels to the matched ground truth tokens 210 also assigns timing labels to the transcript 104. Furthermore, the matched ground truth tokens 210 have corresponding matched predicted tokens 206. Consequently, the audio file 102 can be divided between two selected predicted tokens 206, or other units of speech derived from the predicted tokens, and a corresponding portion of the transcript 104 can be identified. Step 614, includes dividing the audio file into chunks, based in part on the assigned timing labels. Step 616, includes determining transcript portions in the transcript 104, matching the audio file chunks, based in part on the assigned timing labels. For example, a start time, "t1," of a predicted token at the start of an audio chunk and an end time of a predicted token at the end of the audio chunk can be used to identify ground truth tokens, GT1, GT2, corresponding to the times "t1" and "t2," respectively. Tokens in the transcript 104, flanked by GT1, GT2 can be the transcript portion corresponding the audio file chunk. In this manner, audio file chunks and the corresponding transcripts can be generated. In some embodiments, the timing labels can have associated alignment confidence parameter. Chunking the audio file in between tokens having low alignment confidence can be minimized or avoided. Step 618 includes training an AI model with the pairs of audio file chunks and the corresponding transcript portions. The method ends at step 620.

Figure 7:
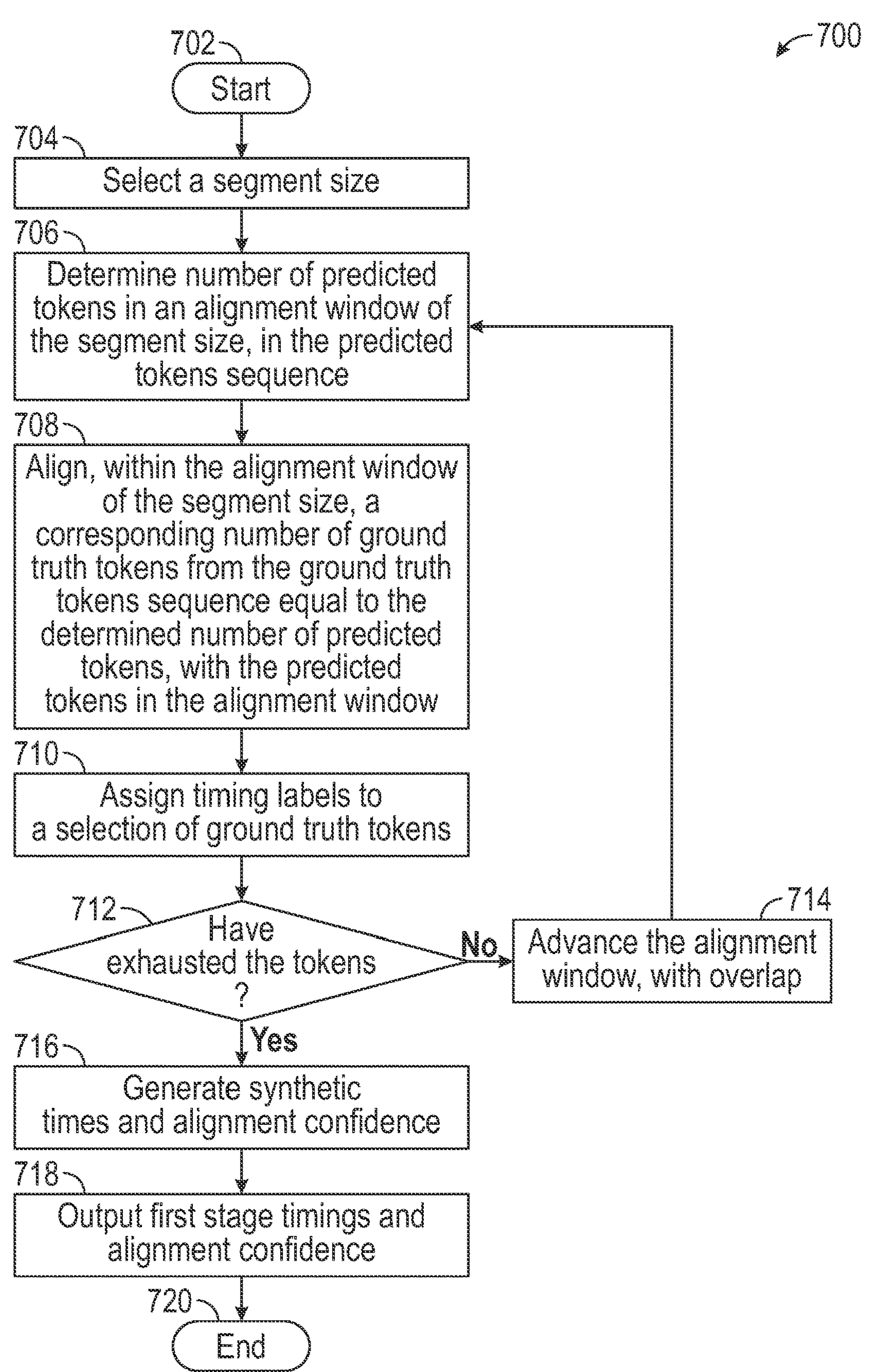
FIG. 7 illustrates a flowchart of a method for generating first stage timings, according to an embodiment.

FIG. 7 illustrates a flowchart of a method 700 for generating first stage timings, according to an embodiment. The method starts at step 702. At step 704, a segment size is selected. At step 706, the number of predicted tokens in an alignment window of the segment size, placed along the predicted tokens 206 sequence, is determined. At step 708, the alignment window of the size equal to the determined number of tokens at step 706 is placed along the ground truth tokens 210 sequence, and a corresponding number of the ground truth tokens 210, from the ground truth tokens 210 sequence, equal to the determined number of predicted tokens at step 706, are aligned with the predicted tokens in the alignment window. "Placing" the alignment window in this context refers to selecting a sequence of tokens from the predicted tokens, and the ground truth tokens sequences to align with one another. Alignment performed at step 708 yields matching ground truth tokens and predicted tokens.

At step 710, timing labels of the matched predicted tokens are assigned to a selection of the matched ground truth tokens. In other words, a selection of the matches are kept, by assigning timing labels from the matching predicted tokens, while a portion of the matches equal to an overlap are discarded and not assigned a corresponding timing label from the matching predicted tokens. At step 712, it is determined whether either of the predicted tokens 206 or the ground truth tokens 210 are exhausted. If no, the method moves to step 714, where the alignment window is advanced. The alignment window is advanced in a manner that leaves an overlap, relative to the previous position of the sliding window. The alignment window is first advanced along the predicted tokens 206 sequence, and the method returns to step 706, where the number of the predicted tokens in the alignment window is redetermined, where steps 708 and 710 are reperformed for the new position of the alignment window, including advancing the alignment window along the ground truth tokens 210 sequence. If either of the predicted tokens 206 sequence or the ground truth tokens 210 sequence are exhausted, the method moves to step 716.

At step 716, synthetic timing labels for unmatched ground truth tokens are generated. Both matched and unmatched tokens can also receive an alignment confidence. At step 718, the timing labels and associated ground truth tokens can be outputted as first stage timings. Additionally, the alignment confidences for each ground truth token can be outputted. The method ends at step 720.

Figure 8:
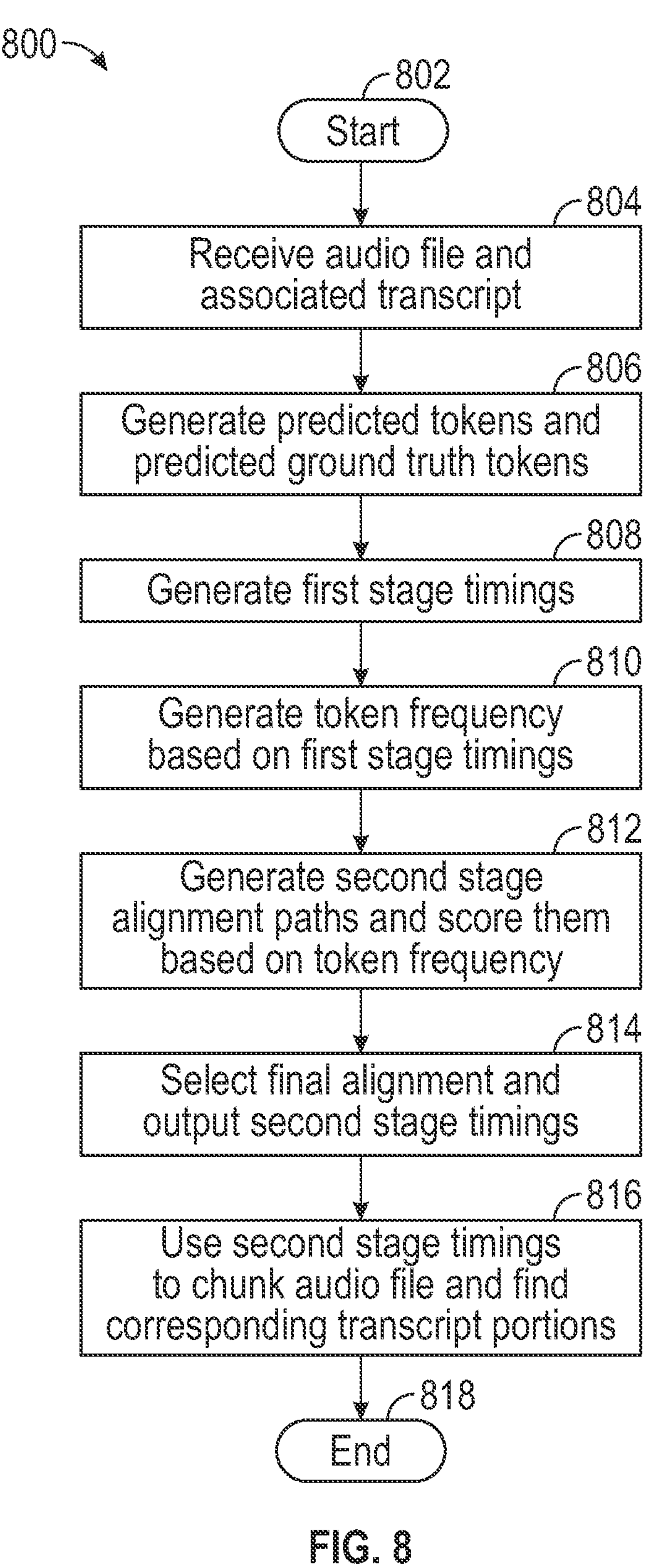
FIG. 8 illustrates an example method of generating second stage timings, based on token frequency, according to an embodiment.

FIG. 8 illustrates an example method 800 of generating second stage timings, based on token frequency, according to an embodiment. The method starts at step 802. At step 804, an audio file 102 and an associated transcript 104 are received. At step 806, predicted tokens 206, and ground truth tokens 210 are generated. At step 808, first stage timings are generated by any of the methods described herein. At step 810, a measure of token frequency is generated for each ground truth token 210, based on the first stage timings generated at step 808. At step 812, second stage alignment paths are generated, and scored based on token frequencies generated at step 810. At step 814, a final alignment is selected, based on the scores generated at step 812. The final alignment yields the second stage timings. At step 816, the second stage timings can be used to divide or chunk the audio file and find corresponding transcript portions to the audio chunks. The pairs of audio chunks and transcript portions can be used in training an AI model. The method ends at step 818.

Figures 9A, 9B:
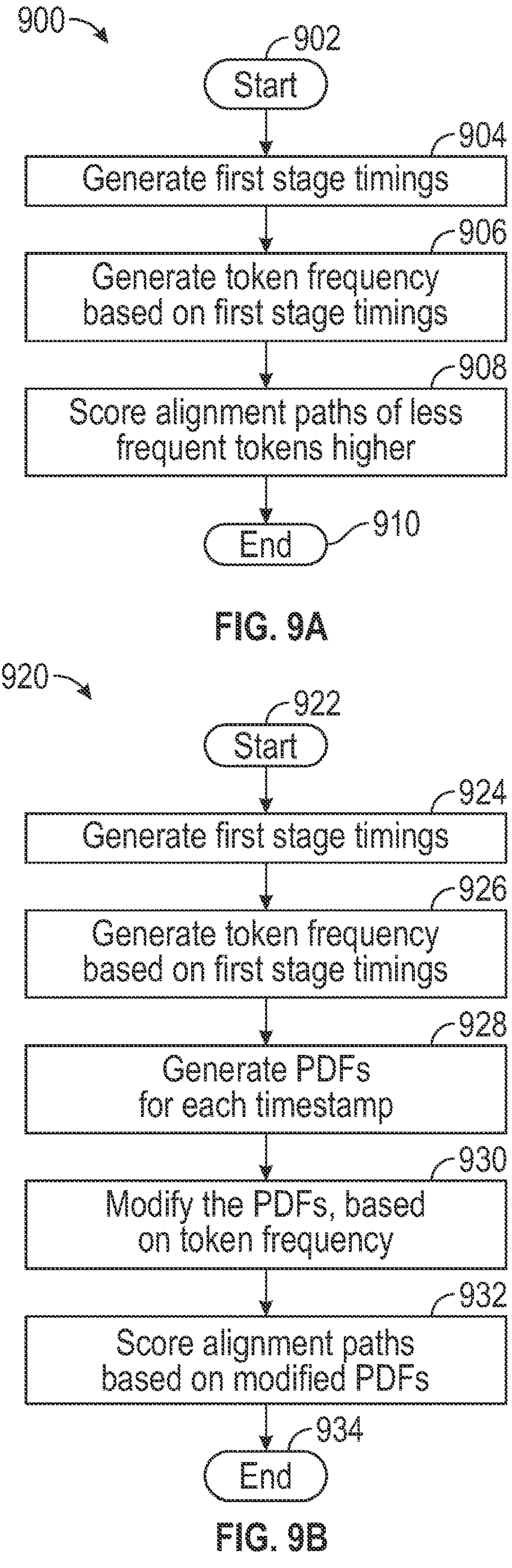
FIGS. 9A and 9B illustrate example flowcharts of scoring alignment paths according to some embodiments.

FIGS. 9A and 9B, respectively, illustrate example flowcharts 900 and 920 of scoring alignment paths according to some embodiments. In some embodiments, some steps of the methods 900, 920 can be used in step 812 of the embodiment of FIG. 8. The method 900 starts at step 902. At step 904, first stage timings are generated. At step 906, token frequency for each ground truth token is generated based on the first stage timings. At step 908, alignment paths between the ground truth tokens and the predicted tokens are scored in part based on token frequency. Alignment paths of less frequent tokens are scored higher. The method ends at step 910.

The method 920 starts at step 922. At step 924, first stage timings are generated. At step 926, a measure of token frequency for each ground truth token is generated, based on the first stage timings. At step 928, probability density functions (PDFs) for each timestamp of the audio file 102 can be generated. At step 930, the PDFs are modified, based on the token frequency, generated at step 926. In some embodiments, the modification includes skewing the PDFs to give more weight to less frequent tokens. Without giving more weight to less frequent tokens, the more frequent tokens can dominate the alignment and cause less accurate alignment outcome. At step 932, a plurality of alignment paths can be scored, using the modified PDFs. The scores can be used to choose a final alignment and generate second stage timings. The method ends at step 934.

Figures 9C, 9D:
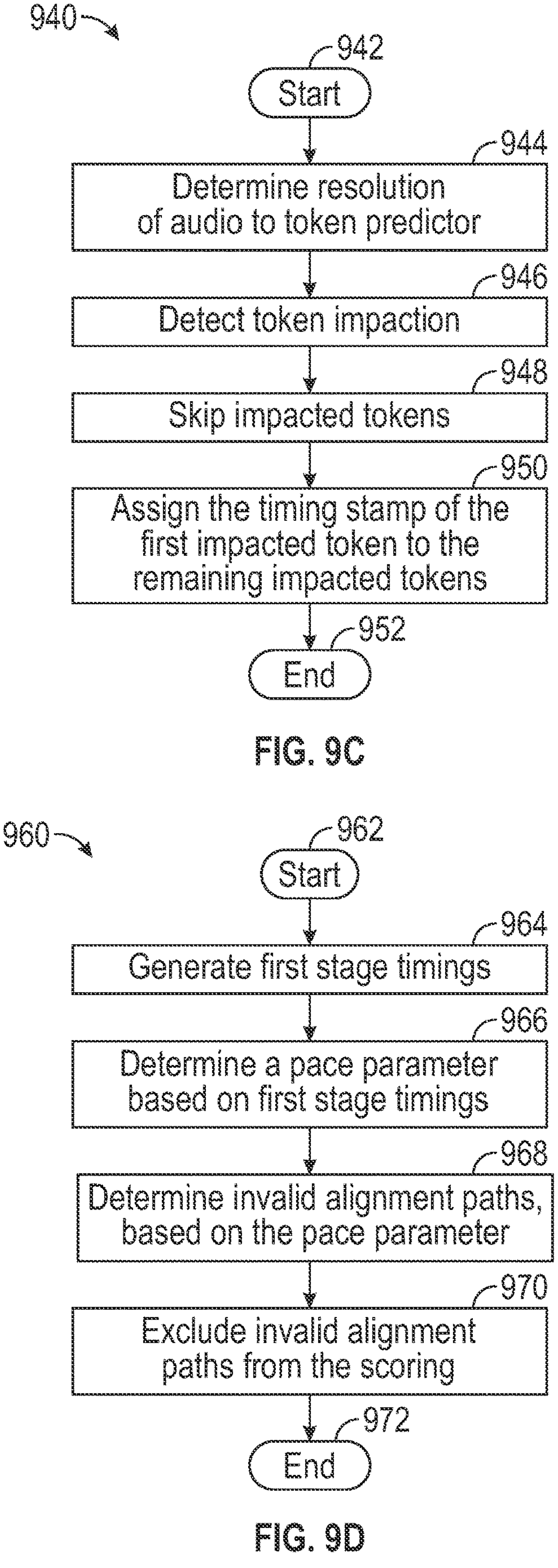
FIG. 9C illustrates an example flowchart of a method of reducing token impaction, when generating predicted tokens with an audio to token predictor.
FIG. 9D illustrates an example flowchart of a method for generating and utilizing a pace parameter when performing second stage alignment.

FIG. 9C illustrates an example flowchart of a method 940 of reducing token impaction, when generating predicted tokens 206 with an audio to token predictor 202. The method starts at step 942. At step 944, the resolution of the audio to token predictor 202, that generates the predicted tokens 206, is determined. At step 946, instances of token impaction in the predicted tokens 206 sequence are determined. Instances of token impaction can occur when the audio file 102 generates more tokens than the resolution of the audio to token predictor. At step 948, the impacted tokens are skipped when generating the predicted tokens 206. At step 950, the timing stamp of the first impacted token is assigned to the remaining impacted tokens. The method ends at step 952.

FIG. 9D illustrates an example flowchart of a method 960 for generating and utilizing a pace parameter when performing second stage alignment. The method 960 can be used to exclude some invalid alignment paths from the second stage alignment operations to save on computing resources. The method starts at step 962. At step 964, first stage timings are generated using any of the described embodiments. At step 966, a pace parameter is determined, based on the first stage timings. In some embodiments, the pace parameter can be generated, in part based on measuring various time intervals or distances between selected tokens in the first stage timings, and/or using statistical techniques. At step 968, the pace parameter can be used to determine invalid alignment paths. In other words, the alignment paths between the ground truth tokens 210 and the predicted tokens 206 that are unlikely given the pace parameter are labeled as invalid. At step 970, the invalid alignment paths are excluded from scoring or further second stage alignment operations. The method ends at step 972.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028.

Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving an artificial intelligence training sample comprising an audio file; receiving a transcript of the audio file; generating a predicted tokens sequence from the audio file, generating predicted timing labels, wherein each predicted token has an associated predicted timing label; predicting a ground truth tokens sequence from the transcript; mapping the ground truth tokens, generated from the transcript to the predicted tokens, generated from the audio file, finding matched tokens; assigning, to the ground truth tokens, the timing labels of the matched tokens; dividing the audio file into chunks, based at least in part on the assigned timing labels; determining portions of the transcript matching the audio file chunks, based at least in part on the assigned timing labels to the matched ground truth tokens; and training a supervised artificial intelligence model with the audio chunks and the matching transcript portions.

Example 2: The method of Example 1, further comprising: selecting a segment size; determining number of predicted tokens in a segment of the predicted tokens sequence of the selected segment size; selecting the same number of ground truth tokens from the ground truth tokens sequence; aligning the selected ground truth tokens in the segment with the predicted tokens in the segment, finding the matched tokens; keeping a selection of the matched tokens in a segment; sliding the segment along the predicted tokens sequence and the ground truth sequence by an amount of overlap; perform the aligning, the keeping and the sliding until the predicted tokens sequence, or the ground truth token sequence is exhausted.

Example 3: The method of some or all of Examples 1 and 2, further comprising: generating and assigning synthetic times to unmatched tokens, wherein determining portions of the transcript matching the audio file chunks is further based on the assigned synthetic times.

Example 4: The method of some or all of Examples 1-3, further comprising: generating and assigning synthetic times to unmatched tokens, wherein determining portions of the transcript matching the audio file chunks is further based on the assigned synthetic times; generating an alignment confidence for the matched tokens; and generating the alignment confidence for the unmatched tokens, wherein dividing the audio file into chunks is further based on the alignment confidence.

Example 5: The method of some or all of Examples 1-4, wherein the audio is not divided at a timestamp adjacent to a token having low alignment confidence.

Example 6: The method of some or all of Examples 1-5, wherein mapping the ground truth tokens to the predicted tokens comprises one or more of calculating minimum Levenshtein distance, longest common subsequence distance, minimum Damerau-Levenshtein distance, and a modified Levenshtein maximal match criterion.

Example 7: The method of some or all of Examples 1-6, wherein tokens comprise phonemes, and the method further comprises: determining word timings in the transcript, based at least in part on the assigned timing labels to the ground truth tokens, wherein dividing the audio file into chunks comprises dividing at timestamps, flanked by whole words.

Example 8: The method of some or all of Examples 1-7, further comprising: selecting a segment size; determining a number of predicted tokens, in an alignment window of the segment size, in the predicted tokens sequence; aligning, within the alignment window of the segment size, a corresponding number of ground truth tokens from the ground truth tokens sequence equal to the determined number of predicted tokens, to the predicted tokens in the alignment window; assigning timing labels, from the aligned predicted tokens to a selection of the aligned ground truth tokens in the alignment window; advancing the alignment window along the predicted tokens sequence and the ground truth tokens sequence, with a selected overlap, until at least one of the sequences is exhausted; performing the determining, the aligning and the assigning until at least one of the sequences is exhausted; and outputting first stage timings, comprising the selected aligned ground truth tokens and the assigned timing labels.

Example 9: The method of some or all of Examples 1-8, further comprising: generating synthetic timing labels for unaligned ground truth tokens; generating an alignment confidence for each timing label assigned to an aligned ground truth token and for each synthetic timing label assigned to an unaligned ground truth token; outputting the alignment confidence.

Example 10: A non-transitory computer storage medium that stores executable program instructions that, when executed by one or more computing devices, configure the one or more computing devices to perform operations comprising: receiving an artificial intelligence training sample comprising an audio file; receiving a transcript of the audio file; generating a predicted tokens sequence from the audio file, generating predicted timing labels, wherein each predicted token has an associated predicted timing label; predicting a ground truth tokens sequence from the transcript; mapping the ground truth tokens, generated from the transcript to the predicted tokens, generated from the audio file, finding matched tokens; assigning, to the ground truth tokens, the timing labels of the matched tokens; dividing the audio file into chunks, based at least in part on the assigned timing labels; determining portions of the transcript matching the audio file chunks, based at least in part on the assigned timing labels to the matched ground truth tokens; and training a supervised artificial intelligence model with the audio chunks and the matching transcript portions.

Example 11: The non-transitory computer storage of Example 10, wherein the operations further comprise: selecting a segment size; determining number of predicted tokens in a segment of the predicted tokens sequence of the selected segment size; selecting the same number of ground truth tokens from the ground truth tokens sequence; aligning the selected ground truth tokens in the segment with the predicted tokens in the segment, finding the matched tokens; keeping a selection of the matched tokens in a segment; sliding the segment along the predicted tokens sequence and the ground truth sequence by an amount of overlap; perform the aligning, the keeping and the sliding until the predicted tokens sequence, or the ground truth token sequence is exhausted.

Example 12: The non-transitory computer storage of some or all of Examples 10 and 11, wherein the operations further comprise: generating and assigning synthetic times to unmatched tokens, wherein determining portions of the transcript matching the audio file chunks is further based on the assigned synthetic times.

Example 13: The non-transitory computer storage of some or all of Examples 10-12, wherein the operations further comprise: generating and assigning synthetic times to unmatched tokens, wherein determining portions of the transcript matching the audio file chunks is further based on the assigned synthetic times; generating an alignment confidence for the matched tokens; and generating the alignment confidence for the unmatched tokens, wherein dividing the audio file into chunks is further based on the alignment confidence.

Example 14: The non-transitory computer storage of some or all of Examples 10-13, wherein the audio is not divided at a timestamp adjacent to a token having low alignment confidence.

Example 15: The non-transitory computer storage of some or all of Examples 10-14, wherein mapping the ground truth tokens to the predicted tokens comprises one or more of calculating minimum Levenshtein distance, longest common subsequence distance, minimum Damerau-Levenshtein distance, and a modified Levenshtein maximal match criterion.

Example 16: The non-transitory computer storage of some or all of Examples 10-15, wherein tokens comprise phonemes, and the operations further comprise: determining word timings in the transcript, based at least in part on the assigned timing labels to the ground truth tokens, wherein dividing the audio file into chunks comprises dividing at timestamps, flanked by whole words.

Example 17: The non-transitory computer storage of some or all of Examples 10-16, wherein the operations further comprise: selecting a segment size; determining a number of predicted tokens, in an alignment window of the segment size, in the predicted tokens sequence; aligning, within the alignment window of the segment size, a corresponding number of ground truth tokens from the ground truth tokens sequence equal to the determined number of predicted tokens, to the predicted tokens in the alignment window; assigning timing labels, from the aligned predicted tokens to a selection of the aligned ground truth tokens in the alignment window; advancing the alignment window along the predicted tokens sequence and the ground truth tokens sequence, with a selected overlap, until at least one of the sequences is exhausted; performing the determining, the aligning and the assigning until at least one of the sequences is exhausted; and outputting first stage timings, comprising the selected aligned ground truth tokens and the assigned timing labels.

Example 18: The non-transitory computer storage of some or all of Examples 10-17, wherein the operations further comprise: generating synthetic timing labels for unaligned ground truth tokens; generating an alignment confidence for each timing label assigned to an aligned ground truth token and for each synthetic timing label assigned to an unaligned ground truth token; outputting the alignment confidence.

Example 19: A system comprising one or more processors, wherein the one or more processors are configured to perform operations comprising: receiving an artificial intelligence training sample comprising an audio file; receiving a transcript of the audio file; generating a predicted tokens sequence from the audio file, generating predicted timing labels, wherein each predicted token has an associated predicted timing label; predicting a ground truth tokens sequence from the transcript; mapping the ground truth tokens, generated from the transcript to the predicted tokens, generated from the audio file, finding matched tokens; assigning, to the ground truth tokens, the timing labels of the matched tokens; dividing the audio file into chunks, based at least in part on the assigned timing labels; determining portions of the transcript matching the audio file chunks, based at least in part on the assigned timing labels to the matched ground truth tokens; and training a supervised artificial intelligence model with the audio chunks and the matching transcript portions.

Example 20: The system of Example 19, wherein the operations further comprise: selecting a segment size; determining number of predicted tokens in a segment of the predicted tokens sequence of the selected segment size; selecting the same number of ground truth tokens from the ground truth tokens sequence; aligning the selected ground truth tokens in the segment with the predicted tokens in the segment, finding the matched tokens; keeping a selection of the matched tokens in a segment; sliding the segment along the predicted tokens sequence and the ground truth sequence by an amount of overlap; perform the aligning, the keeping and the sliding until the predicted tokens sequence, or the ground truth token sequence is exhausted.

Example 21: A method comprising: receiving an audio file and an associated transcript of the audio file; generating ground truth tokens from the transcript; converting the audio file into audio features at a plurality of timestamps of the audio file; generating predicted tokens for each timestamp; performing a first alignment of the ground truth tokens and the predicted tokens, generating first stage timings, wherein the first stage timings comprise the timestamps of the matched predicted tokens assigned to the matched ground truth tokens; performing a second stage alignment comprising: generating a plurality of second stage alignment paths, each path comprising an alignment of the ground truth tokens to the predicted tokens; generating a score for each alignment path, based at least in part on the first stage timings; selecting a final alignment path based at least in part on the scores; generating second stage timings, based at least in part on the selected final alignment path; and assigning timing labels to portions of the transcript, at least in part, based on the second stage timings.

Example 22: The method of Example 21, wherein generating the scores, based at least in part on the first stage timings, further comprises generating the scores based on token rarity derived from the first stage timings.

Example 23: The method of some or all of Examples 21 and 22, wherein generating the scores, based at least in part on the first stage timings, further comprises: determining token frequency from the first stage timings; and scoring alignment paths of less frequent tokens higher than more frequent tokens.

Example 24: The method of some or all of Examples 21-23, wherein generating the scores, based at least in part on the first stage timings, further comprises: generating a probability density function (PDF) for each timestamp; and modifying the PDFs, based at least in part on token frequency, derived from the first stage timings.

Example 25: The method of some or all of Examples 21-24, wherein generating the scores, based at least in part on the first stage timings, further comprises: generating a probability density function (PDF) for each timestamp; modifying the PDFs, based at least in part on token frequency, derived from the first stage timings; and generating the scores, based at least in part on the modified PDFs, wherein less frequent tokens are scored higher than more frequent tokens.

Example 26: The method of some or all of Examples 21-25, wherein generating predicted tokens further comprises: detecting token impaction, based at least in part on a resolution of an audio to token predictor performing the generating of the predicted tokens; and skipping the impacted tokens, by assigning a time stamp of the first token in a sequence of impacted tokens to remainder of tokens in the impacted tokens sequence.

Example 27: The method of some or all of Examples 21-26, further comprising: generating a pace parameter, based at least on the first stage timings; determining invalid alignment paths, based at least in part on the pace parameter; and excluding the invalid alignment paths from the generating of the scores, selecting the final alignment paths and the generating of the second stage timings.

Example 28: The method of some or all of Example 21-27, wherein generating predicted tokens comprise collapsing repeat token sequences into single tokens.

Example 29: The method of some or all of Examples 21-28, wherein one or more connectionist temporal classification (CTC) algorithms perform one or more of the generating of the predicted tokens, the generating of the second stage alignment paths, generating of the scores, the selecting of the final alignment path, and the generating of the second stage timings.

Example 30: The method of some or all of Examples 21-29, wherein generating predicted tokens is performed by a recurrent neural network (RNN) artificial intelligence network.

Example 31: A non-transitory computer storage medium that stores executable program instructions that, when executed by one or more computing devices, configure the one or more computing devices to perform operations comprising: receiving an audio file and an associated transcript of the audio file; generating ground truth tokens from the transcript; converting the audio file into audio features at a plurality of timestamps of the audio file; generating predicted tokens for each timestamp; performing a first alignment of the ground truth tokens and the predicted tokens, generating first stage timings, wherein the first stage timings comprise the timestamps of the matched predicted tokens assigned to the matched ground truth tokens; performing a second stage alignment comprising: generating a plurality of second stage alignment paths, each path comprising an alignment of the ground truth tokens to the predicted tokens; generating a score for each alignment path, based at least in part on the first stage timings; selecting a final alignment path based at least in part on the scores; generating second stage timings, based at least in part on the selected final alignment path; and assigning timing labels to portions of the transcript, at least in part, based on the second stage timings.

Example 32: The non-transitory computer storage of Example 31, wherein generating the scores, based at least in part on the first stage timings, further comprises generating the scores based on token rarity derived from the first stage timings.

Example 33: The non-transitory computer storage of some or all of Examples 31 and 32, wherein generating the scores, based at least in part on the first stage timings, further comprises: determining token frequency from the first stage timings; and scoring alignment paths of less frequent tokens higher than more frequent tokens.

Example 34: The non-transitory computer storage of some or all of Examples 31-33, wherein generating the scores, based at least in part on the first stage timings, further comprises:

generating a probability density function (PDF) for each timestamp; and modifying the PDFs, based at least in part on token frequency, derived from the first stage timings.

Example 35: The non-transitory computer storage of some or all of Examples 31-34, wherein generating the scores, based at least in part on the first stage timings, further comprises: generating a probability density function (PDF) for each timestamp; modifying the PDFs, based at least in part on token frequency, derived from the first stage timings; and generating the scores, based at least in part on the modified PDFs, wherein less frequent tokens are scored higher than more frequent tokens.

Example 36: The non-transitory computer storage of some or all of Examples 31-35, wherein generating predicted tokens further comprises: detecting token impaction, based at least in part on a resolution of an audio to token predictor performing the generating of the predicted tokens; and skipping the impacted tokens, by assigning a time stamp of the first token in a sequence of impacted tokens to remainder of tokens in the impacted tokens sequence.

Example 37: The non-transitory computer storage of some or all of Examples 31-36, wherein the operations further comprise: generating a pace parameter, based at least on the first stage timings; determining invalid alignment paths, based at least in part on the pace parameter; and excluding the invalid alignment paths from the generating of the scores, selecting the final alignment paths and the generating of the second stage timings.

Example 38: The non-transitory computer storage of some or all of Examples 31-37, wherein generating predicted tokens comprise collapsing repeat token sequences into single tokens.

Example 39: The non-transitory computer storage of some or all of Examples 31-38, wherein one or more connectionist temporal classification (CTC) algorithms perform one or more of the generating of the predicted tokens, the generating of the second stage alignment paths, generating of the scores, the selecting of the final alignment path, and the generating of the second stage timings.

Example 40: The non-transitory computer storage of some or all of Examples 31-39, wherein generating predicted tokens is performed by a recurrent neural network (RNN) artificial intelligence network.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:

receiving an audio file and an associated transcript of the audio file;

generating ground truth tokens from the transcript;

converting the audio file into audio features at a plurality of timestamps of the audio file;

generating predicted tokens for each timestamp;

performing a first stage alignment of the ground truth tokens and the predicted tokens, generating first stage timings, wherein the first stage timings comprise the timestamps of the matched predicted tokens assigned to the matched ground truth tokens;

wherein performing the first stage alignment further comprises:

generating a probability density function (PDF) for each timestamp, wherein the PDF comprises a matrix of two dimensions comprising number of time stamps and a vocabulary size;

generating a predicted sequence of tokens from the PDF, by identifying the most probable token at each time stamp;

generating the first stage timings, based at least in part on the predicted sequence of tokens;

performing a second stage alignment comprising:

generating a plurality of second stage alignment paths, each path comprising an alignment of the ground truth tokens to the predicted tokens;

generating a score for each alignment path, based at least in part on the first stage timings, wherein generating the scores, based at least in part on the first stage timings, further comprises:

upweighting the probability of rarer tokens in the PDF, wherein less frequent tokens are scored higher than more frequent tokens;

selecting a final alignment path based at least in part on the scores;

generating second stage timings, based at least in part on the selected final alignment path;

assigning timing labels to portions of the transcript, at least in part, based on the second stage timings;

generating input/output training data, based at least in part on the assigned timing labels, the input/output training data, comprising the portions of the transcript and corresponding portions of the audio file, wherein the correspondence is determined at least in part based on the assigned timing labels;

training a supervised artificial intelligence network with the generated training data; and performing inference operations comprising:

receiving an audio file without a known transcript; and with the trained supervised artificial intelligence network, generating a transcript of the audio file without a known transcript.

2. The method of claim 1, wherein generating the scores, based at least in part on the first stage timings, further comprises generating the scores based on token rarity derived from the first stage timings.

3. The method of claim 1, wherein generating the scores, based at least in part on the first stage timings, further comprises:

determining token frequency from the first stage timings; and scoring alignment paths of less frequent tokens higher than more frequent tokens.

4. The method of claim 1, wherein generating predicted tokens further comprises:

detecting token impaction, based at least in part on a resolution of an audio to token predictor performing the generating of the predicted tokens; and skipping the impacted tokens, by assigning a time stamp of the first token in a sequence of impacted tokens to remainder of tokens in the impacted tokens sequence.

5. The method of claim 1, further comprising:

generating a pace parameter, based at least on the first stage timings;

determining invalid alignment paths, based at least in part on the pace parameter; and excluding the invalid alignment paths from the generating of the scores, selecting the final alignment paths and the generating of the second stage timings.

6. The method of claim 1, wherein generating predicted tokens comprise collapsing repeat token sequences into single tokens.

7. The method of claim 1, wherein one or more connectionist temporal classification (CTC) algorithms perform one or more of the generating of the predicted tokens, the generating of the second stage alignment paths, generating of the scores, the selecting of the final alignment path, and the generating of the second stage timings.

8. The method of claim 1, wherein generating predicted tokens is performed by a recurrent neural network (RNN) artificial intelligence network.

9. A non-transitory computer storage medium that stores executable program instructions that, when executed by one or more computing devices, configure the one or more computing devices to perform operations comprising:

receiving an audio file and an associated transcript of the audio file;

generating ground truth tokens from the transcript;

converting the audio file into audio features at a plurality of timestamps of the audio file;

generating predicted tokens for each timestamp;

performing a first stage alignment of the ground truth tokens and the predicted tokens, generating first stage timings, wherein the first stage timings comprise the timestamps of the matched predicted tokens assigned to the matched ground truth tokens;

wherein performing the first stage alignment further comprises:

generating a probability density function (PDF) for each timestamp, wherein the PDF comprises a matrix of two dimensions comprising number of time stamps and a vocabulary size;

generating a predicted sequence of tokens from the PDF, by identifying the most probable token at each time stamp;

generating the first stage timings, based at least in part on the predicted sequence of tokens;

performing a second stage alignment comprising:

generating a plurality of second stage alignment paths, each path comprising an alignment of the ground truth tokens to the predicted tokens;

generating a score for each alignment path, based at least in part on the first stage timings, wherein generating the scores, based at least in part on the first stage timings, further comprises:

upweighting the probability of rarer tokens in the PDF, wherein less frequent tokens are scored higher than more frequent tokens;

selecting a final alignment path based at least in part on the scores;

generating second stage timings, based at least in part on the selected final alignment path;

assigning timing labels to portions of the transcript, at least in part, based on the second stage timings;

generating input/output training data, based at least in part on the assigned timing labels, the input/output training data, comprising the portions of the transcript and corresponding portions of the audio file, wherein the correspondence is determined at least in part based on the assigned timing labels;

training a supervised artificial intelligence network with the generated training data; and performing inference operations comprising:

receiving an audio file without a known transcript; and with the trained supervised artificial intelligence network, generating a transcript of the audio file without a known transcript.

10. The non-transitory computer storage of claim 9, wherein generating the scores, based at least in part on the first stage timings, further comprises generating the scores based on token rarity derived from the first stage timings.

11. The non-transitory computer storage of claim 9, wherein generating the scores, based at least in part on the first stage timings, further comprises:

determining token frequency from the first stage timings; and scoring alignment paths of less frequent tokens higher than more frequent tokens.

12. The non-transitory computer storage of claim 9, wherein generating predicted tokens further comprises:

detecting token impaction, based at least in part on a resolution of an audio to token predictor performing the generating of the predicted tokens; and skipping the impacted tokens, by assigning a time stamp of the first token in a sequence of impacted tokens to remainder of tokens in the impacted tokens sequence.

13. The non-transitory computer storage of claim 9, wherein the operations further comprise:

generating a pace parameter, based at least on the first stage timings;

determining invalid alignment paths, based at least in part on the pace parameter; and excluding the invalid alignment paths from the generating of the scores, selecting the final alignment paths and the generating of the second stage timings.

14. The non-transitory computer storage of claim 9, wherein generating predicted tokens comprise collapsing repeat token sequences into single tokens.

15. The non-transitory computer storage of claim 9, wherein one or more connectionist temporal classification (CTC) algorithms perform one or more of the generating of the predicted tokens, the generating of the second stage alignment paths, generating of the scores, the selecting of the final alignment path, and the generating of the second stage timings.

16. The non-transitory computer storage of claim 9, wherein generating predicted tokens is performed by a recurrent neural network (RNN) artificial intelligence network.

17. A system comprising one or more processors, wherein the one or more processors are configured to perform operations comprising:

receiving an audio file and an associated transcript of the audio file;

generating ground truth tokens from the transcript;

converting the audio file into audio features at a plurality of timestamps of the audio file;

generating predicted tokens for each timestamp;

performing a first stage alignment of the ground truth tokens and the predicted tokens, generating first stage timings, wherein the first stage timings comprise the timestamps of the matched predicted tokens assigned to the matched ground truth tokens;

wherein performing the first stage alignment further comprises:

generating a probability density function (PDF) for each timestamp, wherein the PDF comprises a matrix of two dimensions comprising number of time stamps and a vocabulary size;

generating a predicted sequence of tokens from the PDF, by identifying the most probable token at each time stamp;

generating the first stage timings, based at least in part on the predicted sequence of tokens;

performing a second stage alignment comprising:

generating a plurality of second stage alignment paths, each path comprising an alignment of the ground truth tokens to the predicted tokens;

generating a score for each alignment path, based at least in part on the first stage timings, wherein generating the scores, based at least in part on the first stage timings, further comprises:

upweighting the probability of rarer tokens in the PDF, wherein less frequent tokens are scored higher than more frequent tokens;

selecting a final alignment path based at least in part on the scores;

generating second stage timings, based at least in part on the selected final alignment path;

assigning timing labels to portions of the transcript, at least in part, based on the second stage timings;

generating input/output training data, based at least in part on the assigned timing labels, the input/output training data, comprising the portions of the transcript and corresponding portions of the audio file, wherein the correspondence is determined at least in part based on the assigned timing labels;

training a supervised artificial intelligence network with the generated training data; and performing inference operations comprising:

receiving an audio file without a known transcript; and with the trained supervised artificial intelligence network, generating a transcript of the audio file without a known transcript.

18. The system of claim 17, wherein generating the scores, based at least in part on the first stage timings, further comprises:

determining token frequency from the first stage timings; and scoring alignment paths of less frequent tokens higher than more frequent tokens.

19. The system of claim 17, wherein generating predicted tokens further comprises:

detecting token impaction, based at least in part on a resolution of an audio to token predictor performing the generating of the predicted tokens; and skipping the impacted tokens, by assigning a time stamp of the first token in a sequence of impacted tokens to remainder of tokens in the impacted tokens sequence.

20. The system of claim 17, wherein the operations further comprises:

generating a pace parameter, based at least on the first stage timings;

determining invalid alignment paths, based at least in part on the pace parameter; and excluding the invalid alignment paths from the generating of the scores, selecting the final alignment paths and the generating of the second stage timings.

* * * * *